(12) United States Patent
Percival

(10) Patent No.: US 7,167,903 B2
(45) Date of Patent: Jan. 23, 2007

(54) SYSTEM AND METHOD FOR USER UPDATEABLE WEB SITES AND WEB PAGES

(75) Inventor: John Nicholas Percival, Ridgefield, CT (US)

(73) Assignee: TeacherWeb, Inc., Ridgefield, CT (US)

( * ) Notice: Subject to any disclaimer, the term of this patent is extended or adjusted under 35 U.S.C. 154(b) by 484 days.

(21) Appl. No.: 09/841,177

(22) Filed: Apr. 25, 2001

(65) Prior Publication Data
US 2004/0039795 A1    Feb. 26, 2004

(51) Int. Cl.
G06F 15/16    (2006.01)
(52) U.S. Cl. .................................. 709/217; 709/203
(58) Field of Classification Search ................ 709/203, 709/217
See application file for complete search history.

(56) References Cited

U.S. PATENT DOCUMENTS

| | | | |
|---|---|---|---|
| 6,026,433 A * | 2/2000 | D'Arlach et al. ........... | 709/217 |
| 6,178,432 B1 | 1/2001 | Cook et al. | |
| 6,185,587 B1 | 2/2001 | Bernardo et al. | |
| 6,192,415 B1 | 2/2001 | Haverstock et al. | |
| 6,349,797 B1 * | 2/2002 | Newville et al. ........... | 187/396 |
| 6,988,138 B1 * | 1/2006 | Alcorn et al. ............... | 709/225 |

OTHER PUBLICATIONS

Microsoft® Office, Microsoft® FrontPage® 2000 Product Enhancements Guide, pp. 1-19 (Oct. 1998).
Microsoft® Office, Microsoft® FrontPage® 98 Online Brochure (2002).

* cited by examiner

Primary Examiner—Bunjob Jaroenchonwanit
Assistant Examiner—Lan-Dai Thi Truong
(74) Attorney, Agent, or Firm—Stevens, Davis, Miller & Mosher, LLP

(57) ABSTRACT

A hosted system and method for user creation and update of a user Web, provides for customization of appearance and functionality of a user Web that is totally separate from the maintenance of the variable contents of a user Web. The hosted system and method of the present invention first generates a fixed default design for a user's Web site of at least one generic type of page and the linkages between this page and a Home Page. Thereafter, the hosted system provides capabilities for a user to perform multiple, generic types of customization of the appearance of a user Web from which both a 'view' and a companion 'update' Web page is generated for each user page. Any variable content of a 'view' page of a user Web is entered and updated by the user employing the 'update' Web page after the Web site has been generated and stored at a Host by the hosted system and method of the present invention.

26 Claims, 43 Drawing Sheets

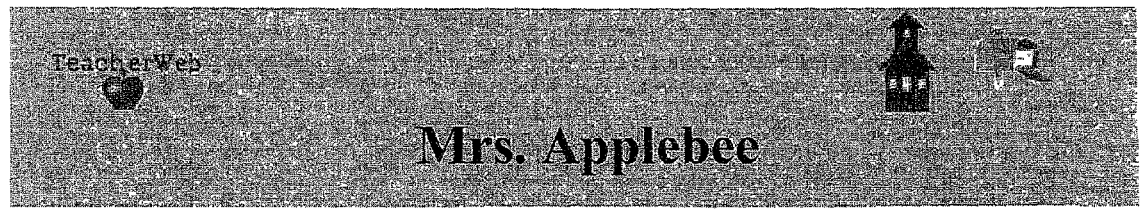
| | | |
|---|---|---|
| 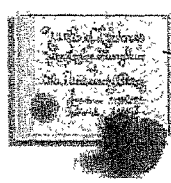 |  | |
| About The Teacher | Homework | Announcements |
|  |  | 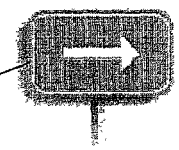 |
| FAQ | Calendar | Links |
| 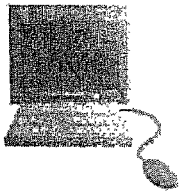 |  | 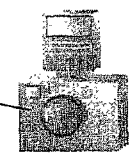 |
| Extra Credit | Today's SAT Question | Photo/Docs |
|  | 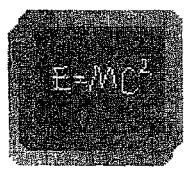 |  |
| Homework2 | Science Club | Homework3 |
FIG. 1A

Name to appear on web pages: (e.g. Mrs. Jones, Jane Jones, 7th Grade English):
[          *          ]

Your Current
Email Address: [                    ]*
☐ I do NOT want students/parents to email me from my web site.

Click in a white circle to select your website's color/pattern from the list below. Click on the description to see a sample of that style. (You will be able to change this after your web is created.)

Solid Colors (Background / Divider Line)
- ⦿ white/red
- ○ white/dark green
- ○ white/purple
- ○ purple/dark purple
- ○ blue/dark blue
- ○ gold/purple
- ○ teal/dark blue
- ○ white/orange
- ○ white/royal blue
- ○ green/dark green
- ○ yellow/black
- ○ gold/dark green
- ○ tan/dark green
- ○ blue/red
- ○ white/green
- ○ white/maroon
- ○ orange/black
- ○ white/light blue
- ○ gold/maroon
- ○ blue/orange
- ○ lilac/dark blue Patterns
- ○ math/dark blue
- ○ blue/calculator
- ○ white/cross
- ○ yellow/paintbottles
- ○ tan/sports
- ○ green/apple
- ○ white/computer
- ○ white/flags
- ○ white/USflags
- ○ Blue/Springtime
- ○ science/dark blue
- ○ elem blackboard/abc
- ○ white/star-of-david
- ○ green/ruler
- ○ white/music
- ○ blue/globes
- ○ white/kids of the world
- ○ tan/leaves
- ○ white/shamrocks
- ○ yellow/SpringFlowers
- ○ white/school bus
- ○ globes/dark blue
- ○ blue/kids of the world
- ○ books/dark blue
- ○ green/books
- ○ white/pencil
- ○ elem blackboard/apples
- ○ pink/hearts
- ○ blue/Stars&Stripes
- ○ lilac/EasterEggs Enter the password that you will use to update your web site. The password can be any combination of up to 20 letters and numbers.
Enter Password: [          *          ]

Fig. 1B

Jane Teacher

[ Home | Teacher | Announcements | FAQ | Links | Calendar | Email ]

Homework

<u>20</u>

If you have questions or problems regarding this web site, you can email me at <u>JaneTeacher@TeacherWeb.com</u>.

© 2000, 2001 TeacherWeb.Com

TeacherWeb

Jane Teacher

Update: | Teacher | Announcements | FAQ | Links | Calendar | Other |
View: | Teacher | Homework | Announcements | FAQ | Links | Calendar |

Update Homework

If you have previously made changes to this page, in this Internet session, you may have to click on your Reload/Refresh button to see those changes reflected below and to preserve those changes as you make new changes.

20

Password: [        ]

[Submit Homework Page]    —21

FIG. 2B

TeacherWeb

Jane Teacher

Update: | Teacher | Announcements | FAQ | Links | Calendar | Other |
View: | Teacher | Homework | Announcements | FAQ | Links | Calendar |

Update Homework

If you have previously made changes to this page, in this Internet session, you may have to click on your Reload/Refresh button to see those changes reflected below and to preserve those changes as you make new changes.

```
Read Pages 1 - 12
Solve the following problem:
    1
   +1
   --
    ?
Memorize:  The quick brown fox jumped over the lazy dog.  The green cat
snores.
```

30

Password: [_____31_____]

[Submit Homework Page] —32

TeacherWeb
Jane Teacher
[ Home | Teacher | Announcements | FAQ | Links | Calendar | Email ]
Homework
```
Read Pages 1 - 12
Solve the following problem:
   1
  +1
  --
   ?
Memorize: The quick brown fox jumped over the lazy dog. The green cat
snores.
```
40
If you have questions or problems regarding this web site, you can email me at JaneTeacher@TeacherWeb.com.
© 2000, 2001 TeacherWeb.Com
FIG. 4

NAME (Recommended: A single short line.)

Mrs. Teacher

SCHOOL (Recommended: A single short line.)

Appleton High School

CLASS (Recommended: A single short line.)

10th Grade Science

SCHOOL PHONE (Recommended: A single short line.)

555-1212

50

About The Teacher

I have been a teacher for 12 years, the last eight years at the high school level. I teach Biology and Earth Science to 10th graders this year, and I also mentor the Science Club.

I live in the community of Appleton with my husband, four children, two dogs and a cat.

Mission For The Class

My goal for the class is to foster a deeper understanding of the sciences, as well as an appreciation for scientific methods. I like to incorporate lab work with reading, as well as field work when possible.

FIG. 5

TeacherWeb 

Jane Teacher

[ Home | Homework | Announcements | FAQ | Links | Calendar | Email ]

50

NAME: Mrs. Teacher

SCHOOL: Appleton High School

CLASS: 10th Grade Science

SCHOOL PHONE: 555-1212

About The Teacher

I have been a teacher for 12 years, the last eight years at the high
school level. I teach Biology and Earth Science to 10th graders this
year, and I also mentor the Science Club.

I live in the community of Appleton with my husband, four children,
two dogs and a cat.

Mission For The Class

My goal for the class is to foster a deeper understanding of the
sciences, as well as an appreciation for scientific methods. I like
to incorporate lab work with reading, as well as field work when
possible.

FIG. 6

Link 1 Name/Description

Astronomy for Kids:

Link 1 URL http://www.frontiernet.net/~kidpower/astronomy.html

Link 2 Name/Description

Dept of Energy's Kid Zone:

Link 2 URL http://www.energy.gov/kidz/kidzone.htm

70

Link 3 Name/Description

Nova Online: Mysteries of the Nile:

Link 3 URL http://www.pbs.org/wgbh/nova/egypt/

Link 4 Name/Description

Link 4 URL

FIG. 7A

```
<tr><td colspan="2"><b>Link 1 Name/Description</b></td></tr>
<tr><td colspan="2"><textarea wrap="hard" name="Link1Name" rows="3" cols="70">
Astronomy for Kids:</textarea></td></tr>
<tr><td colspan="2"><b>Link 1 URL</b></td></tr>
<tr><td colspan="2"><input type="text" size="80" maxlength="255" name="Link1URL"
value="http://www.frontiernet.net/~kidpower/astronomy.html"></td></tr>
<tr><td colspan="2"><br></td></tr>
<tr><td colspan="2"><b>Link 2 Name/Description</b></td></tr>
<tr><td colspan="2"><textarea wrap="hard" name="Link2Name" rows="3" cols="70">
Dept of Energy's Kid Zone:</textarea></td></tr>
<tr><td colspan="2"><b>Link 2 URL</b></td></tr>
<tr><td colspan="2"><input type="text" size="80" maxlength="255" name="Link2URL"
value="http://www.energy.gov/kidz/kidzone.htm"></td></tr>
<tr><td colspan="2"><br></td></tr>
<tr><td colspan="2"><b>Link 3 Name/Description</b></td></tr>
<tr><td colspan="2"><textarea wrap="hard" name="Link3Name" rows="3" cols="70">
Nova Online: Mysteries of the Nile:</textarea></td></tr>
<tr><td colspan="2"><b>Link 3 URL</b></td></tr>
<tr><td colspan="2"><input type="text" size="80" maxlength="255" name="Link3URL"
value="http://www.pbs.org/wgbh/nova/egypt/"></td></tr>
<tr><td colspan="2"><br></td></tr>
<tr><td colspan="2"><b>Link 4 Name/Description</b></td></tr>
<tr><td colspan="2"><textarea wrap="hard" name="Link4Name" rows="3" cols="70">
</textarea></td></tr>
<tr><td colspan="2"><b>Link 4 URL</b></td></tr>
<tr><td colspan="2"><input type="text" size="80" maxlength="255" name="Link4URL"
value=""></td></tr>
```

FIG. 7B

TeacherWeb

Jane Teacher

[ Home | Teacher | Homework | Announcements | FAQ | Calendar | Email ]

Links

```
Astronomy for Kids:
http://www.frontiernet.net/~kidpower/astronomy.html

Dept of Energy's Kid Zone:
http://www.energy.gov/kidz/kidzone.htm

Nova Online: Mysteries of the Nile:
http://www.pbs.org/wgbh/nova/egypt/
```

Search

Yahooligans! - Search Engine Designed for Kids. Sites selected by the YAHOO! Inc. staff.
To search the World Wide Web, type your search words in the box below and click on the Search button:

FIG. 8A

```
<tr><td colspan="2"><pre cols=71>Astronomy for Kids:<br><a
href="http://www.frontiernet.net/~kidpower/astronomy.html">http://www.frontiernet.net/~kidpo
wer/astronomy.html</a></pre></td></tr>
<tr><td colspan="2"><br><pre cols=71>Dept of Energy's Kid Zone:<br><a
href="http://www.energy.gov/kidz/kidzone.htm">http://www.energy.gov/kidz/kidzone.htm</a>
</pre></td></tr>
<tr><td colspan="2"><br><pre cols=71>Nova Online: Mysteries of the Nile:<br><a
href="http://www.pbs.org/wgbh/nova/egypt/">http://www.pbs.org/wgbh/nova/egypt/</a></pre>
</td></tr>
```

FIG. 8B

Question 1

What is the final grade based upon?

Answer 1

```
20% lab reports
10% class participation
30% final exam
```

Question 2

When are you available for extra help?

Answer 2

```
Tuesdays & Thursdays after school until 4:00 pm.
Wednesday mornings before school, starting at 7:00 am.
Other times by apppointment.
```

Question 3

Will there be field trips?

Answer 3

```
There will be at least one field trip each semester.  We try to go to
the Museum of Natural History each year.  Other field trips are
scheduled based upon the unit we are currently studying.
```

Question 4

Answer 4

FIG. 9A

```
<tr><td colspan="2"><b>Question 1</b></td></tr>
<tr><td colspan="2"><input type="text" size="70" maxlength="70" name="Question1"
value="What is the final grade based upon?"> </td></tr>
<tr><td colspan="2"><b>Answer 1</b></td></tr>
<tr><td colspan="2"><textarea name="Answer1" rows="3" wrap="hard" cols="70">30% test
scores
10% quizzes
20% lab reports
10% class participation
30% final exam</textarea></td></tr>
<tr><td colspan="2"><b>Question 2</b></td></tr>
<tr><td colspan="2"><input type="text" size="70" maxlength="70" name="Question2"
value="When are you available for extra help?"> </td></tr>
<tr><td colspan="2"><b>Answer 2</b></td></tr>
<tr><td colspan="2"><textarea name="Answer2" rows="3" wrap="hard" cols="70">Tuesdays
& Thursdays after school until 4:00 pm.
Wednesday mornings before school, starting at 7:00 am.
Other times by apppointment.</textarea></td></tr>
<tr><td colspan="2"><b>Question 3</b></td></tr>
<tr><td colspan="2"><input type="text" size="70" maxlength="70" name="Question3"
value="Will there be field trips?"> </td></tr>
<tr><td colspan="2"><b>Answer 3</b></td></tr>
<tr><td colspan="2"><textarea name="Answer3" rows="3" wrap="hard" cols="70">There will
be at least one field trip each semester.  We try to go to
the Museum of Natural History each year.  Other field trips are
scheduled based upon the unit we are currently studying.</textarea></td></tr>
<tr><td colspan="2"><b>Question 4</b></td></tr>
<tr><td colspan="2"><input type="text" size="70" maxlength="70" name="Question4"
value=""> </td></tr>
<tr><td colspan="2"><b>Answer 4</b></td></tr>
<tr><td colspan="2"><textarea name="Answer4" rows="3" wrap="hard"
cols="70"></textarea></td></tr>
```

FIG. 9B

Frequently Asked Questions

This page contains answers to common questions of students and parents.

1. What is the final grade based upon?
2. When are you available for extra help?
3. Will there be field trips?

---

What is the final grade based upon?

30% test scores
    10% quizzes
    20% lab reports
    10% class participation
    30% final exam Back to Top

---

When are you available for extra help?

Tuesdays & Thursdays after school until 4:00 pm.
    Wednesday mornings before school, starting at 7:00 am.
    Other times by apppointment.

Back to Top

---

Will there be field trips?

There will be at least one field trip each semester. We try to go to
    the Museum of Natural History each year. Other field trips are
    scheduled based upon the unit we are currently studying.

Back to Top

FIG. 10A

```
<ol>
<li><a href="#q1">What is the final grade based upon?</a></li>
<li><a href="#q2">When are you available for extra help?</a></li>
<li><a href="#q3">Will there be field trips?</a></li>
</ol>
<hr><p><b><a name="q1">What is the final grade based upon?</a></b></p>
<blockquote><pre cols=71>30% test scores
10% quizzes
20% lab reports
10% class participation
30% final exam</pre>
<h5><a href="#Top">Back to Top</a></h5></blockquote>
<hr><p><b><a name="q2">When are you available for extra help?</a></b></p>
<blockquote><pre cols=71>Tuesdays & Thursdays after school until 4:00 pm.
Wednesday mornings before school, starting at 7:00 am.
Other times by apppointment.</pre>
<h5><a href="#Top">Back to Top</a></h5></blockquote>
<hr><p><b><a name="q3">Will there be field trips?</a></b></p>
<blockquote><pre cols=71>There will be at least one field trip each semester.  We try to go to
the Museum of Natural History each year.  Other field trips are
scheduled based upon the unit we are currently studying.</pre>
<h5><a href="#Top">Back to Top</a></h5></blockquote>
```

FIG. 10B

| February | 12 | 2001 | Book Fair |
| --- | --- | --- | --- |
| February | 19 | 2001 | Presidents Day - no school |
| February | 28 | 2001 | Report cards mailed home |
| March | 01 | 2001 | Field Trip to Scuence Museum |
| March | 15 | 2001 | Parent conferencesby appointment |
| March | 16 | 2001 | Parent conferencesby appointment |
| March | 31 | 2001 | SAT test - be here by 8:15 am - bring 2 pencils |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |
| Month | 01 | 2001 | |

Password: [    ]

[Submit Calendar Page]

```
<TABLE WIDTH="640" BORDER="0" CELLSPACING="0" CELLPADDING="0">
<tr><td width="15%"><select name=month01 size=1 value=""><option
value=Month>Month</option><OPTION value=August>August</OPTION><OPTION
value=September>September</OPTION><OPTION
value=October>October</OPTION><OPTION
value=November>November</OPTION><OPTION
value=December>December</OPTION><OPTION
value=January>January</OPTION><OPTION selected
value=February>February</OPTION><OPTION value=March>March</OPTION><OPTION
value=April>April</OPTION><OPTION value=May>May</OPTION><OPTION
value=June>June</OPTION><OPTION value=July>July</OPTION></select></td>
<td width="10%"><select  name=day01 size=1 value=""><OPTION
value=01>01</OPTION><OPTION value=02>02</OPTION><OPTION
value=03>03</OPTION><OPTION value=04>04</OPTION><OPTION
value=05>05</OPTION><OPTION value=06>06</OPTION><OPTION
value=07>07</OPTION><OPTION value=08>08</OPTION><OPTION
value=09>09</OPTION><OPTION value=10>10</OPTION><OPTION
value=11>11</OPTION><OPTION selected value=12>12</OPTION><OPTION
value=13>13</OPTION><OPTION value=14>14</OPTION><OPTION
value=15>15</OPTION><OPTION value=16>16</OPTION><OPTION
value=17>17</OPTION><OPTION value=18>18</OPTION><OPTION
value=19>19</OPTION><OPTION value=20>20</OPTION><OPTION
value=21>21</OPTION><OPTION value=22>22</OPTION><OPTION
value=23>23</OPTION><OPTION value=24>24</OPTION><OPTION
value=25>25</OPTION><OPTION value=26>26</OPTION><OPTION
value=27>27</OPTION><OPTION value=28>28</OPTION><OPTION
value=29>29</OPTION><OPTION value=30>30</OPTION><OPTION
value=31>31</OPTION></select></td>
<td width="10%"><select  name=year01 size=1 value=""><OPTION
value=2000>2000</OPTION><OPTION selected value=2001>2001</OPTION><OPTION
value=2002>2002</OPTION><OPTION value=2003>2003</OPTION></select></td>
<td width="65%"><INPUT name=event01 maxLength=100 type=text size=65 value="Book
Fair"></td>
</tr>
<tr><td width="15%"><select name=month02 size=1 value=""><option
value=Month>Month</option><OPTION value=August>August</OPTION><OPTION
value=September>September</OPTION><OPTION
value=October>October</OPTION><OPTION
value=November>November</OPTION><OPTION
```

FIG. 11B

TeacherWeb 

Jane Teacher

[ Home | Teacher | Homework | Announcements | FAQ | Links | Email ]

Calendar

February
12  Monday      Book Fair
19  Monday      Presidents Day - no school
28  Wednesday   Report cards mailed home

March
1   Thursday    Field Trip to Scuence Museum
15  Thursday    Parent conferencesby appointment
16  Friday      Parent conferencesby appointment
31  Saturday    SAT test - be here by 8:15 am - bring 2 pencils!

If you have questions or problems regarding this web site, you can email me at JaneTeacher@TeacherWeb.com.

© 2000, 2001 TeacherWeb.Com

FIG. 12A

```
<table border="0" width="640" cellspacing="0" cellpadding="0">
<tr><td colspan="3"><b><font size="4">February</b></td></tr>
<tr><td width="5%" valign="top">12</td>
<td width="15%" valign="top">Monday</td>
<td width="80%">Book Fair</td></tr>
<tr><td width="5%" valign="top">19</td>
<td width="15%" valign="top">Monday</td>
<td width="80%">Presidents Day - no school</td></tr>
<tr><td width="5%" valign="top">28</td>
<td width="15%" valign="top">Wednesday</td>
<td width="80%">Report cards mailed home</td></tr>
<tr><td colspan="3"><br><b><font size="4">March</b></td></tr>
<tr><td width="5%" valign="top"> 1</td>
<td width="15%" valign="top">Thursday</td>
<td width="80%">Field Trip to Scuence Museum</td></tr>
<tr><td width="5%" valign="top">15</td>
<td width="15%" valign="top">Thursday</td>
<td width="80%">Parent conferencesby appointment</td></tr>
<tr><td width="5%" valign="top">16</td>
<td width="15%" valign="top">Friday</td>
<td width="80%">Parent conferencesby appointment</td></tr>
<tr><td width="5%" valign="top">31</td>
<td width="15%" valign="top">Saturday</td>
<td width="80%">SAT test - be here by 8:15 am - bring 2 pencils!</td></tr>
</table>
```

FIG. 12B

| Name/Description | File Name | |
|---|---|---|
| Our Field Trip to Paris | c:\Graphics\Trip.gif | Browse... |
| Our Field Trip to Animal Shelter - 1 | c:\Graphics\Trip2.gif | Browse... |
| Our Field Trip to Animal Shelter - 2 | c:\Graphics\Trip3.gif | Browse... |
| Biology Grades in Word format | c:\Documents\Grades.doc | Browse... |
| Biology Grades in Excel format | c:\Documents\Grades.xls | Browse... |
|  |  | Browse... |
|  |  | Browse... |
|  |  | Browse... |
|  |  | Browse... |
|  |  | Browse... |
|  |  | Browse... |
|  |  | Browse... |
|  |  | Browse... |
|  |  | Browse... |
|  |  | Browse... |

130

Password: [          ]

[ Submit Photos Page ]

FIG. 13A

```
<input type="hidden" name="Pictures" value="YYYYYNNNNNNNNNN">
<input type="hidden" name="Extent1" value=".gif">
<input type="hidden" name="Extent2" value=".gif">
<input type="hidden" name="Extent3" value=".gif">
<input type="hidden" name="Extent4" value=".gif">
<input type="hidden" name="Extent5" value=".gif">
<input type="hidden" name="Extent6" value="">
<input type="hidden" name="Extent7" value="">
<input type="hidden" name="Extent8" value="">
<input type="hidden" name="Extent9" value="">
<input type="hidden" name="Extent10" value="">
<input type="hidden" name="Extent11" value="">
<input type="hidden" name="Extent12" value="">
<input type="hidden" name="Extent13" value="">
<input type="hidden" name="Extent14" value="">
<input type="hidden" name="Extent15" value="">
<tr><td><input type=text name="name1" value="Our Field Trip to Paris" size=30 maxlength=255></td>
<td><input type="file" name="file1" value="*.jpg" Title=File1.gif size=35 maxlength=255></td></tr>
<tr><td><input type=text name="name2" value="Our Field Trip to Animal Shelter - lost cat" size=30 maxlength=255></td>
<td><input type="file" name="file2" value="*.jpg" Title=File2.gif size=35 maxlength=255></td></tr>
<tr><td><input type=text name="name3" value="Our Field Trip to Animal Shelter - dogs to adopt" size=30 maxlength=255></td>
<td><input type="file" name="file3" value="*.jpg" Title=File3.gif size=35 maxlength=255></td></tr>
<tr><td><input type=text name="name4" value="Biology Grades in Word format" size=30 maxlength=255></td>
<td><input type="file" name="file4" value="*.jpg" Title=File4.gif size=35 maxlength=255></td></tr>
<tr><td><input type=text name="name5" value="Biology Grades in Excel format" size=30 maxlength=255></td>
<td><input type="file" name="file5" value="*.jpg" Title=File5.gif size=35 maxlength=255></td></tr>
<tr><td><input type=text name="name6" value="" size=30 maxlength=255></td>
<td><input type="file" name="file6" value="*.jpg" size=35 Title=Empty maxlength=255></td></tr>
<tr><td><input type=text name="name7" value="" size=30 maxlength=255></td>
<td><input type="file" name="file7" value="*.jpg" size=35 Title=Empty maxlength=255></td></tr>
<tr><td><input type=text name="name8" value="" size=30 maxlength=255></td>
```

FIG. 13B

TeacherWeb

Jane Teacher

[ Home | Teacher | Homework | Announcements | FAQ | Links | Calendar | Email ]

Photos

Click on an item in the list below to view a photo or download a document.
Our Field Trip to Paris
Our Field Trip to Animal Shelter - lost cat
Our Field Trip to Animal Shelter - dogs to adopt
Biology Grades in Word format
Biology Grades in Excel format If you have questions or problems regarding this web site, you can email me at JaneTeacher@TeacherWeb.com.

© 2000, 2001 TeacherWeb.Com

FIG. 14A

```
<tr><td align=LEFT width=600 valign=CENTER bgcolor="#FFFFAD"><font size="+1"> <a
href=file1.gif>Our Field Trip to Paris</a></font></td></tr>
<tr><td align=LEFT width=600 valign=CENTER bgcolor="#FFFFAD"><font size="+1"> <a
href=file2.gif>Our Field Trip to Animal Shelter - lost cat</a></font></td></tr>
<tr><td align=LEFT width=600 valign=CENTER bgcolor="#FFFFAD"><font size="+1"> <a
href=file3.gif>Our Field Trip to Animal Shelter - dogs to adopt</a></font></td></tr>
<tr><td align=LEFT width=600 valign=CENTER bgcolor="#FFFFAD"><font size="+1"> <a
href=file4.gif>Biology Grades in Word format</a></font></td></tr>
<tr><td align=LEFT width=600 valign=CENTER bgcolor="#FFFFAD"><font size="+1"> <a
href=file5.gif>Biology Grades in Excel format</a></font></td></tr>
```

FIG. 14B

| Page Name | File Name | |
|---|---|---|
| Grades | c:\Excel Spead Sheets\Grades.html | Browse |
| Schedule | c:\Excel Spead Sheets\Schedule.html | Browse |
| Homework | c:\PDF Files\Homework 2-29-01.html | Browse |

Password: [          ]

[Submit My Pages] To have your changes reflected on the Home Page and Navigation Bar *after* you Submit your changes, you must go to the Other Changes section of your Update Index page and click on the Re-Generate Web button.

FIG. 15A

```
<TABLE WIDTH="640" BORDER="0" CELLSPACING="0" CELLPADDING="0">
<tr><td width="15%"><br></td>
<td width="85%"><br></td></tr>
<tr><td width="15%"><b>Page Name</b></td>
<td width="85%"><b>File Name</b></td></tr>
<input type="hidden" name="WebPages" value="YYY">
<tr><td><input type=text name="name1" value="Grades" size=15 maxlength=15></td>
<td><input type="file" name="page1" value="*.jpg" Title=Page1.stm size=50 maxlength=255></td></tr>
<tr><td><input type=text name="name2" value="Schedule" size=15 maxlength=15></td>
<td><input type="file" name="page2" value="*.jpg" Title=Page2.stm size=50 maxlength=255></td></tr>
<tr><td><input type=text name="name3" value="Homework" size=15 maxlength=15></td>
<td><input type="file" name="page3" value="*.jpg" Title=Page3.stm size=50 maxlength=255></td></tr>
</table>
```

FIG. 15B

Sheet1

| | CHEMISTRY 201 GRADES | | | |
|---|---|---|---|---|
| The last 4 digits of your Student ID # is your code word. | | | | |
| Code # | | Exam Grade | Final Grade | Effort Grade |
| 3525 | | B+ | B+ | A |
| 2885 | | C+ | B+ | B+ |
| 8609 | | A | A | A |
| 1472 | | B | B+ | B |
| 2376 | | B | B+ | B+ |
| 6137 | | A | B+ | B |

Last Updated on 1/25/2001
By TeacherWeb

FIG. 16

Jane Teacher

[ Home | Teacher | Homework | Announcements | FAQ | Links | Calendar | Photos | Email ]

HTMLPage1

Sheet1

|  | CHEMISTRY 201 GRADES |  |  |
|---|---|---|---|
| The last 4 digits of your Student ID # is your code word |  |  |  |
| Code # | Exam Grade | Final Grade | Effort Grade |
| 3525 | B+ | B+ | A |
| 2885 | C+ | B+ | B+ |
| 8609 | A | A | A |
| 1472 | B | B+ | B |
| 2375 | B | B+ | B+ |
| 6137 | A | B+ | B |

*Last Updated on 1/25/2001*
*By TeacherWeb*

FIG. 17A

Updating The Body Of An *Integrated Web Page* page

Update Index

| | | |
|---|---|---|
| About the Teacher | View | Update |
| Homework | View | Update |
| Announcements | View | Update |
| FAQ | View | Update |
| Links | View | Update |
| Calendar | View | Update |

Change Password

TeacherWeb location handout

Help - Frequently Asked Questions About TeacherWeb

[Other Changes]

FIG. 18

OTHER CHANGES

For regular updates of your web pages (e.g. changing a Homework assignment), use the Update page links above. For other changes, click on the appropriate button below:

[Change Graphics]
[Change Name/Email Address]
[Add/Delete/Rename Pages]
[Change Fixed Text]
[Customize Home Page]

Re-Generate your web ONLY when instructed to by TeacherWeb
[Re-Generate Web]

[Delete Web]

FIG. 19

Backgrounds
To change your background, click on the circle to the left of the desired background. You can see a sample page with the specified background by clicking on the text describing the background and then select Back on your browser to return to this page.

| | | |
|---|---|---|
| ○ white | ○ tan | ○ blue |
| ○ green | ○ orange | ○ lilac |
| ○ teal | ○ yellow | ○ gold |
| ○ purple | ⊙ science | ○ math |
| ○ globes | ○ Elem. Blackboard | ○ books |
| ○ bg1 | ○ bg3 | ○ bg5 |
| ○ bg6 | ○ bg7 | ○ elegant |
| ○ harvest | ○ leaves | ○ snow |
| | ○ No Change | |

FIG. 20

Divider Lines
To change your divider lines, click on the circle to the left of the desired divider line. You can see the divider line by clicking on the text describing the divider line and then select Back on your browser to return to this page.

| | | |
|---|---|---|
| ○ blue | ○ dark blue | ○ green |
| ○ dark green | ○ purple | ○ yellow |
| ○ orange | ○ brown | ○ maroon |
| ○ royal blue | ○ black | ○ cross |
| ○ pencil | ○ StarOfDavid | ○ ruler |
| ○ paint bottles | ○ school bus | ○ calculator |
| ○ kids of the world | ○ apple | ○ books and apples |
| ○ abc | ○ dark purple | ○ books |
| ○ music | ○ sports | ○ light blue |
| ○ red | ○ globes | ○ computer |
| ○ harvest | ○ Line1 | ○ Line2 |
| ○ Line3 | ○ Line4 | ○ Line42 |
| ○ Line5 | ○ Line6 | ○ Line7 |
| ○ pumpkin | ○ Thanksgiving | ○ leaves |
| ○ Science Lab | ○ animated bar | ○ animated coins |
| ○ animated Xmas lights | ○ Xmas trees | ○ snow |
| ○ flags | ○ books and glasses | ○ magnifying glass |
| ○ snow men | ○ dreidel | ○ animated Xmas |
| ○ Xmas ball | ○ Xmas trees2 | ○ Happy Holidays |
| ○ New Year | ○ Hearts | ○ Heart Design |
| ○ Red, White, Blue | ○ Turning Wheel | ○ Turning Wheel2 |
| ○ Turning World | ○ Flowers | ○ Turning Jewels |
| ○ Neon Blue | ○ Neon Green | ○ Neon Red |
| ○ Light Bar | ○ Fishing Boat | ○ Nautical |
| ○ Stars and Stripes | ○ US Flags | ○ US Flags Small |
| ○ Shamrocks | ○ Easter | ○ Easter Baskets |
| ○ Easter Eggs | ○ Spring Time | ○ Spring Flowers |
| ○ Candy Hearts | ● No Change | |

FIG. 21

Graphics For Home Page

| Announcements | announce.gif |
| Homework | homework.gif |
| Links | links.gif |
| FAQ | question.gif |
| Teacher | teacher.gif |
| Calendar | calendar.gif |

Graphics For View Pages
To change back to having no picture for any entry, type in "Picture.gif".

| Teacher | Photo.gif |

FIG. 22

Your name as you would like it to appear on your web pages:
Jane Teacher

Use the field below to change your email address. Do NOT blank this field out to remove email. (The field will be blank if you are not allowing students to email from your website. If it's blank, fill it in ONLY if you have a new email address for us to contact you at.)
Email Address: JaneTeacher@TeacherWeb.com To allow/disallow students to email you from your website, then check or uncheck the box below.
Include Email: ☑

To rename the Email facility in your web pages' navigation bars, use the field below.
Email Name: Email

FIG. 24

Choose Pages to include or exclude - or - Change Page Names
(e.g. Teacher --> Professor)

| Include | Original Name | New Page Name |
|---|---|---|
| ☑ | Teacher | Teacher |
| ☑ | Homework | Homework |
| ☑ | Announcements | Announcements |
| ☑ | FAQ | FAQ |
| ☑ | Links | Links |
| ☑ | Calendar | Calendar |
|  | Extra Pages |  |
| ☐ | Homework2 | Homework2 |
| ☐ | Homework3 | Homework3 |
| ☐ | Homework4 | Homework4 |
| ☐ | Homework5 | Homework5 |
| ☐ | Homework6 | Homework6 |
| ☐ | Homework7 | Homework7 |
| ☐ | Links2 | Links2 |
| ☐ | Links3 | Links3 |
| ☐ | Links4 | Links4 |
| ☐ | Links5 | Links5 |
| ☐ | Links6 | Links6 |
| ☐ | Links7 | Links7 |
| ☐ | Calendar2 | Calendar2 |
| ☐ | Calendar3 | Calendar3 |
| ☐ | Calendar4 | Calendar4 |
| ☐ | Calendar5 | Calendar5 |
| ☐ | Calendar6 | Calendar6 |
| ☐ | Calendar7 | Calendar7 |

FIG. 25A

| Page Name | Fixed Text |
|---|---|
| Teacher | NAME |
| Teacher | SCHOOL |
| Teacher | CLASS |
| Teacher | SCHOOL PHONE |
| Teacher | About The Teacher |
| Teacher | Mission For The Class |
| FAQ | Frequently Asked Questions |
| FAQ | This page contains answers to common qu |
| Photos | Click on an item in the list below to view a p |

☑ Include The Search Facility on the Links Page

☐ Include The User's Guide to Query Language on the Links Page

FIG. 26

School Link
To add (delete) a link to your school's web site, check (uncheck) the box below.
☐ Include School Link If you are including a link to your school's web site, type in that web address below. Please provide the whole address including the http://
School Web Site Address
[http://                              ]

Top Banner Color
To change the color of your Home Page's top banner, click on the circle to the left of the desired color.
○ yellow       ○ blue        ○ green       ○ pink
○ orchid       ○ lime        ○ gold        ○ aqua
○ light blue   ⊙ No Change Email Icon
To change the icon representing Email, click on and select the circle to the left of the desired icon. To view an email icon, click on its name to the right of the circle.
○ Default      ○ Ani-Mail Me    ○ Ani-Mailbox    ○ Ani-Mailbox2
○ Ani-Mailbox3 ○ Ani-Mailbox4   ○ Ani-Mailbox5   ○ Ani-Mailbox6
○ Ani-Blue     ○ Ani-Green      ○ Ani-Purple     ○ Ani-Red
○ Ani-Yellow   ○ Ani-PC         ○ Ani-Cactus     ○ Ani-Stamp1
○ Ani-Stamp2   ○ Ani-Stamp3     ○ Ani-Stamp4     ○ Ani-Stamper
○ Ani-Text     ○ Ani-Text2      ○ Ani-E          ○ Ani-Flowers
○ Ani-Clouds   ○ Ani-Wings      ○ Ani-Teacher    ○ Ani-@
○ Ani-Star     ○ Ani-Scroll     ⊙ No Change Select Home Page Style
⊙ Both Text And Graphics    ○ Graphics Only    ○ Text Only

FIG. 27A

Order Pages
To reorder how your pages are listed on your Home Page, select Special Order below and enter numbers into the text boxes to the left of your pages. The numbers must range from 1 to the total number of pages. The navigation bar will NOT be re-ordered. If you subsequently Delete a page, you may have to re-order your pages again.

○ Use Default Order     ◉ Special Order

[2]   Announcements
        [1]   Homework
        [6]   Links
        [3]   FAQ
        [5]   Teacher
        [4]   Calendar

FIG. 27B

Find Your Teacher on TeacherWeb.com

Choose a State or Country & Click Go:

CA - California

FIG. 28

You Selected CA - California
Now Find Your Teacher's City or School

Choose a City or School & Click Go:

Bakersfield

 2000 TeacherWeb.Com

FIG. 29

You Selected Bakersfield, California
Now Find Your Teacher

Once you've reached your teacher's web site, remember to Bookmark it (or add to Favorites) so that you can go DIRECTLY to the site next time.

Choose a Teacher & Click Go:

Olsen

 2000 TeacherWeb.Com

FIG. 30

SYSTEM AND METHOD FOR USER UPDATEABLE WEB SITES AND WEB PAGES

FIELD OF THE INVENTION

The present invention relates to an authoring system and method for generation and maintenance of user Webs containing user updateable variable content Web pages. More particularly, the present invention relates to customization of the appearance, structure, and variable content of user Webs by users. Most particularly, the present invention provides a Hosted system and method which employs pre-stored parameterized code for generation and user maintenance of their Webs (User Updateable Web Site or UUWS) and the variable content of the constituent Web pages (User Updateable Web Page or UUWP).

DISCUSSION OF THE PRIOR ART

A Web site typically comprises at least a Home page and one or more additional Web pages linked together in an organization that allows a user to both navigate to and access objects pointed at by these and other links contained in the Web site's pages. The organization of a Web site is defined by the various Web page links, with the Home Page serving as an initial entry point. Users download and view Web pages using a Web browser such as NETSCAPE NAVIGATOR or MICROSOFT INTERNET EXPLORER. The pages are displayed one at a time and can include multimedia components and selectable partial screen overlays. Each page can contain hypertext links to other pages available on the same or another Web site.

Web page structure and content are specified using hypertext markup language (HTML). That is, HTML tags are used to define the layout or structure of the Web pages and to provide content and links to other objects. HTML is a highly specialized language that is both difficult to compose and read. This precludes non-technical individuals from creating Web sites or including content in a Web site. This can be especially limiting because both structure and content need to be repeatedly updated over time as a Web evolves through use. Web site and Web page structure are generally less dynamic than Web page content, but, depending on the application, Web page content can be very perishable and require frequent refreshing by non-technical end users.

In order to make Web site and Web page design and implementation more accessible to users, commercial products for Web site and Web page authoring have become readily available, e.g., MICROSOFT FrontPage which employs HTML templates containing Include statements and user-recognizable HTML tags (Web Class markers) that are ignored by a browser but are processed by user written applications. While these authoring products do require less expertise of Web site and Web page designers, they are not accessible to truly non-technical end users and do require that the user have the program running on the user's workstation.

Another approach to facilitating both Web site and Web page design is disclosed by Bernardo, et al. (U.S. Pat. No. 6,185,587 B1), incorporated herein by reference as if fully set forth herein. Bernardo, et al. disclose a tool comprising a library of a plurality of templates corresponding to pre-defined features available in a Web site. The templates are used when the tool prompts the user through a series of pre-stored views to select the features and options desired for a Web site and its constituent Web pages. The user of the tool is also prompted to supply data to populate fields of the pre-stored templates that the tool determines are required by the user's selected features and options. Then, based on the identified templates and supplied data, the tool generates a customized Web site without the user writing any HTML or other programming code. A user can only add new Web pages that are based on pre-defined page templates, provide content for already selected page templates, edit previously provided content, as well as edit the structure of existing page templates. The tool is intended to support Web site designers as well as non-technical Web page content composers in a corporate or organizational setting. Use of the tool requires elaborate setup, computer/network facilities, administration, and specialized training. The system taught by Bernardo, et al. is not intended to be a turnkey or commercially available system, such as MICROSOFT FRONTPAGE. Experts are required to customize and install this system for a particular organizational environment and once installed, the system is administered by that organization for the benefit of its members and clientele.

SUMMARY OF THE INVENTION

Thus, while there is technology that can address the need for user updateable Webs and their Web pages, it is complex and requires expert and on-going customization, installation, administration and training of its user community. A system and method providing updateable Webs and Web pages, as a service requiring no installation, administration or training, is needed for truly lay user communities.

The present invention overcomes these and other deficiencies and drawbacks of prior art Web site authoring and update techniques, systems, and methods. The present invention provides a network-accessible Hosted software system and method for creating user updateable Web sites (UUWS) comprising user updateable Web pages (UUWP) which requires a user to have only a Web browser and rudimentary knowledge of how to navigate a Web site and enter data and make selections in Web pages. The system and method of the present invention is a Hosted internet-based approach to meeting the needs of a lay user community for user updateable Webs and Web pages.

Throughout the following discussions the following convention is used. A generic type of UUWP is italicized and an instance of a generic type of UUWP has one or more capitalized first letters and is underlined.

The system and method of the present invention provides a user or community of users with a set of basic page types with which the Host of the system and method of the present invention can construct and install a starter Web. The Host of the system and method of the present invention solicits user Web site type selection and a few personal parameter inputs and then executes parameterized software that employs these user parameter inputs to generate a Web comprising linked Web pages in HTML format, the Web pages being of the types in the pre-selected Web site type. That is, at the outset, in a preferred embodiment, a lay user or community of lay users provides defaults for all the parameters in accordance with the Web site type that the user or community wants as a starter Web. In particular, the system provides data storage containing a set of user updateable Web page types comprising a predefined set of user updateable Web page types that are defined in parameterized software.

In a preferred embodiment of the present invention, a first step, prior to individual users creating Webs, is to solicit and store user community requirements as parameters in a file. These parameters then become the default parameters used by a whole class of users for a particular Web Site type. Then individual users can request starter Webs and cause parameterized software to read this parameter file and generate HTML for the user's starting Web. In a preferred embodiment, the user can specify the types of access to the Web that is to be provided to various classes of users. The user's Web is then installed on a network accessible Host for the lay user or community of users to access and customize, i.e., it is an instance of a UUWS containing UUWPs which can be accessed by a specific user or community of users. In a preferred embodiment of the present invention, the Host assumes responsibility for requirements gathering, Web definition, Web generation, Web installation and Web administration. The users are concerned with Web content and not implementation and maintenance of the Web's infrastructure.

In a preferred embodiment, the present invention performs the following method:

1. A user provides parameters, which describe the Web site type and a few personal parameters (e.g., name and email address) to define a starting Web.
2. These parameters are stored in a parameter file.
3. A starting Web is defined using the Web site type, the personal parameters and a large number of defaults.
4. A starting Web is then generated from the parameter file by executing highly parameterized code that employs the parameter file. The generated Web, i.e., UUWS, is represented by a schematic of linked page types with associated user specified parameters.
5. The generated Web is installed on an internet-accessible Host computer as a UUWS containing UUWPs, for subsequent review, update and regeneration by the user. The generated Web pages, i.e., UUWPs, are HTML and consist of fixed parts and variable parts with the variable parts being represented by one or more Include files that can be separately modified.
6. The user updates the "variable" content of the Web pages by changing only the "variable" parts of each page, one UUWP at a time. Only the Include files that are associated with the Web page being updated are changed as a result. Each UUWP page is really two pages, a first or 'view' page that everyone sees and a tailor made companion 'update' page into which the user enters information to update the content of the 'view' page. Depending on the page type, a user can enter text or a file name.
7. The program regenerates the user's UUWP page's Include file.
8. Steps 6 and 7 are repeated by the user as often as necessary to maintain the Web site.
9. The "fixed" part of the UUWPs and the UUWS (e.g., the Home Page and navigation bars linking the pages together) can also be customized by the user by editing the existing parameters that define the fixed part as displayed in Web pages that are customized to a user's specific Web.
10. The program then regenerates the whole UUWS—the Include files containing the variable user provided content are unaffected.

In a preferred embodiment of the present invention, a network-accessible computer-based service is provided which uses parameterized code for creating a starting user updateable Web site containing user updateable Web pages, by first soliciting user parameters and storing them in a computer readable file. The computer readable file is then accessed by the parameterized software as it executes to generate the UUWS and its UUWPs for installation on a Host and subsequent access as a UUWS by users over the Internet using a Web browser. The tool and service combine to form a Hosted system and method for simplifying the creation of a customized and customizable Web by avoiding the need for a user to know or use HTML or any other language. The parameterized code generates a starting user updateable Web site (UUWS) based on a plurality of instances of pre-selected user updateable Web page (UUWP) types which correspond in type and style to the user-supplied parameters stored in the parameter file.

According to further features of a preferred embodiment of the present invention, any number of user defined Web pages (UDWP) may also be included in a user Web page type page. Many tools that users employ to develop documentation, such as MICROSOFT WORD and MICROSOFT EXCEL, allow the user to save that documentation as HTML files. This feature of a preferred embodiment allows the user to make this documentation available for viewing over the Internet via browsers. The user neither needs to know HTML nor even needs to see the generated HTML. This feature also provides a knowledgeable user, i.e., one who can define and generate Web pages, with a means to extend the functionality of a UUWS with non-standard Web pages whose structure and content are the sole responsibility of the user. However, even UDWPs can be updated using the system and method of the present invention.

In a preferred embodiment, a user can create, customize and update a UUWS and its constituent UUWPs using WebTV, personal digital assistant (PDA) or other Web appliances.

BRIEF DESCRIPTION OF THE DRAWINGS

The features and advantages of the present invention will be better understood by referring to the following detailed description taken in conjunction with the following drawings:

FIG. 1A illustrates a Home page for an embodiment for a teacher community.

FIGS. 1B–D illustrates Web personalization input pages for an embodiment for a teacher community.

FIG. 2B is an 'update' Homework page for the page Single Updateable Text Block page shown in FIG. 2A.

FIG. 3 is an example of user input into the 'update' Homework page shown in FIG. 2B.

FIG. 4 is the regenerated 'view' Homework page resulting from the user entered input shown in FIG. 3.

FIG. 5 is a 'view' About The Teacher page for an example of a teacher Web, where the About The Teacher page is an instance of a Multiple Updateable Text Blocks page type.

FIG. 6 is an 'update' About The Teacher page for the page shown in FIG. 5.

FIG. 7A is an 'update' Links and Search page for an example of a teacher Web, where the Links and Search page is an instance of a Links page type.

FIG. 7B is the HTML generated by the system and method of the present invention for the 'update' Links and Search page shown in FIG. 7A.

FIG. 8A is the regenerated 'view' Links and Search page resulting from the user input shown in FIG. 7A.

FIG. 8B is the HTML for the regenerated 'view' Links and Search page produced by the system and method of the present invention.

FIG. 9A is an 'update' Frequently Asked Questions page for an example of a teacher Web, where the Frequently Asked Questions page is an instance of an Index List and Entries page type.

FIG. 9B is the HTML generated by the system and method of the present invention for the 'update' Frequently Asked Questions page shown in FIG. 9A.

FIG. 10A is the regenerated 'view' Frequently Asked Questions page resulting from the user entered input shown in FIG. 9A.

FIG. 10B is the HTML for the regenerated by 'view' Frequently Asked Questions page produced by the system and method of the present invention.

FIG. 11A is and, 'update' Calendar page for an example of a teacher Web, where the Calendar page is an instance of a Table page type.

FIG. 11B is the HTML generated by the system and method of the present invention for the 'update' Calendar page shown in FIG. 11A.

FIG. 12A is the regenerated 'view' Calendar page resulting from the user entered input shown in FIG. 11A.

FIG. 12B is the HTML for the regenerated 'view' Calendar page produced by the system and method of the present invention.

FIG. 13A is and 'update' Photos page for an example of a teacher Web, where the Photos page is an instance of a Uploaded File page type.

FIG. 13B is the HTML generated by the system and method of the present invention for the 'update' Photos page shown in FIG. 13A.

FIG. 14A is the regenerated 'view' Photos page resulting from the user entered input shown in FIG. 13A.

FIG. 14B is the HTML for the regenerated 'view' Photos page produced by the system and method of the present invention.

FIG. 15A is a partial view of an 'update' My Pages page for an example of a teacher Web, where the My Pages page is an instance of an Uploaded Web page type.

FIG. 15B is the HTML generated by the system and method of the present invention for the 'update' My Pages page shown in FIG. 15A.

FIG. 16 is an example of a spreadsheet saved as HTML and used to create a 'view' My Pages page, which is an instance of an Uploaded Web page type. The resultant page does not have the same look and feel and functionality as the other pages in the example of a teacher Web.

FIG. 17A is an example of a spreadsheet saved as HTML and used to create a 'view' Integrated My Pages page, which is an instance of an Integrated Uploaded Web page type. The resultant 'view' page does have the same look and feel and functionality as the other pages in the example of a teacher Web.

FIG. 18 is an example of the top of an Update Index page that contains links to all the 'view' UUWPs in the UUWS and to all the associated 'update' pages for an example teacher Web.

FIG. 19 is an example of the bottom of an Update Index page that contains command buttons to invoke the other types of Web site customization changes that can be made by a user.

FIG. 20 is an example of the section of the Update Graphics Web page for customizing the background color of UUWPs of a UUWS.

FIG. 21 is an example of the section of the Update Graphics Web page for customizing the divider lines of UUWPs of a UUWS.

FIG. 22 is an example of the section of the Update Graphics Web page for customizing the icons displayed on the Home page for a UUWS.

FIG. 24 is an example of a Change Name/e-Mail Address customization page.

FIG. 25A is an example of an Add/Delete/Rename Pages customization page showing the original set of UUWPs selected based on user requirements and the extra UUWPs a user can add to an existing UUWS.

FIG. 26 is an example of a Change Fixed Text customization page that lists all of the updateable fixed text on each UUWP of a given UUWS (in this case and example of a teacher Web) that a user can update.

FIG. 27A is an example of a Customize Home Page customization page that is specific to a given UUWS, in this case a teacher Web.

FIG. 27B is an example of how a user can designate and change the order in which UUWPs are listed on the Home page.

FIG. 28 is an example of part one of a three part Find Your Teacher index capability. This illustrates a student selecting California as the state for his school.

FIG. 29 is an example of part two of a three part Find Your Teacher index capability. This figure illustrates a student selecting Bakersfield as the city for his school.

FIG. 30 is an example of part three of a three part Find Your Teacher index capability. This figure illustrates a student selecting Olsen as the name of his teacher.

DETAILED DESCRIPTION OF THE PREFERRED EMBODIMENTS

In a preferred embodiment there are three main components of a UUWS, namely:
1. Generation of a UUWS;
2. The individual UUWPs of a UUWS; and
3. Customization of a UUWS.

1. Generation of a UUWS

Figure 1C:
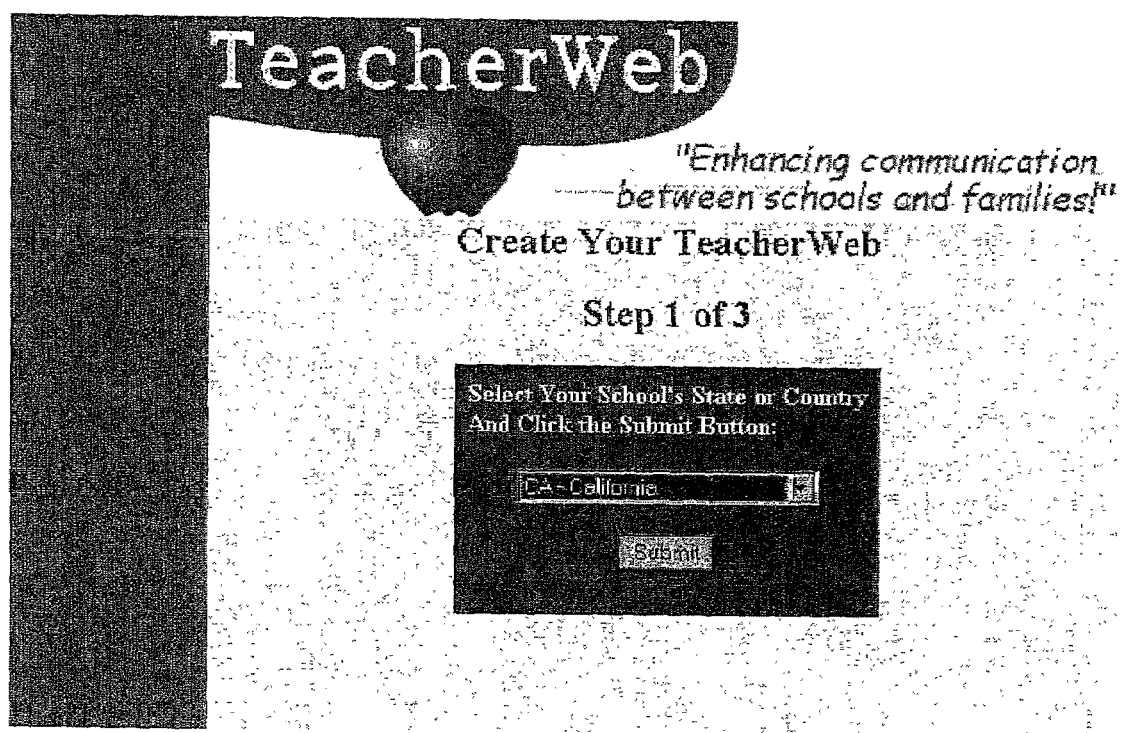
Figure 1D:
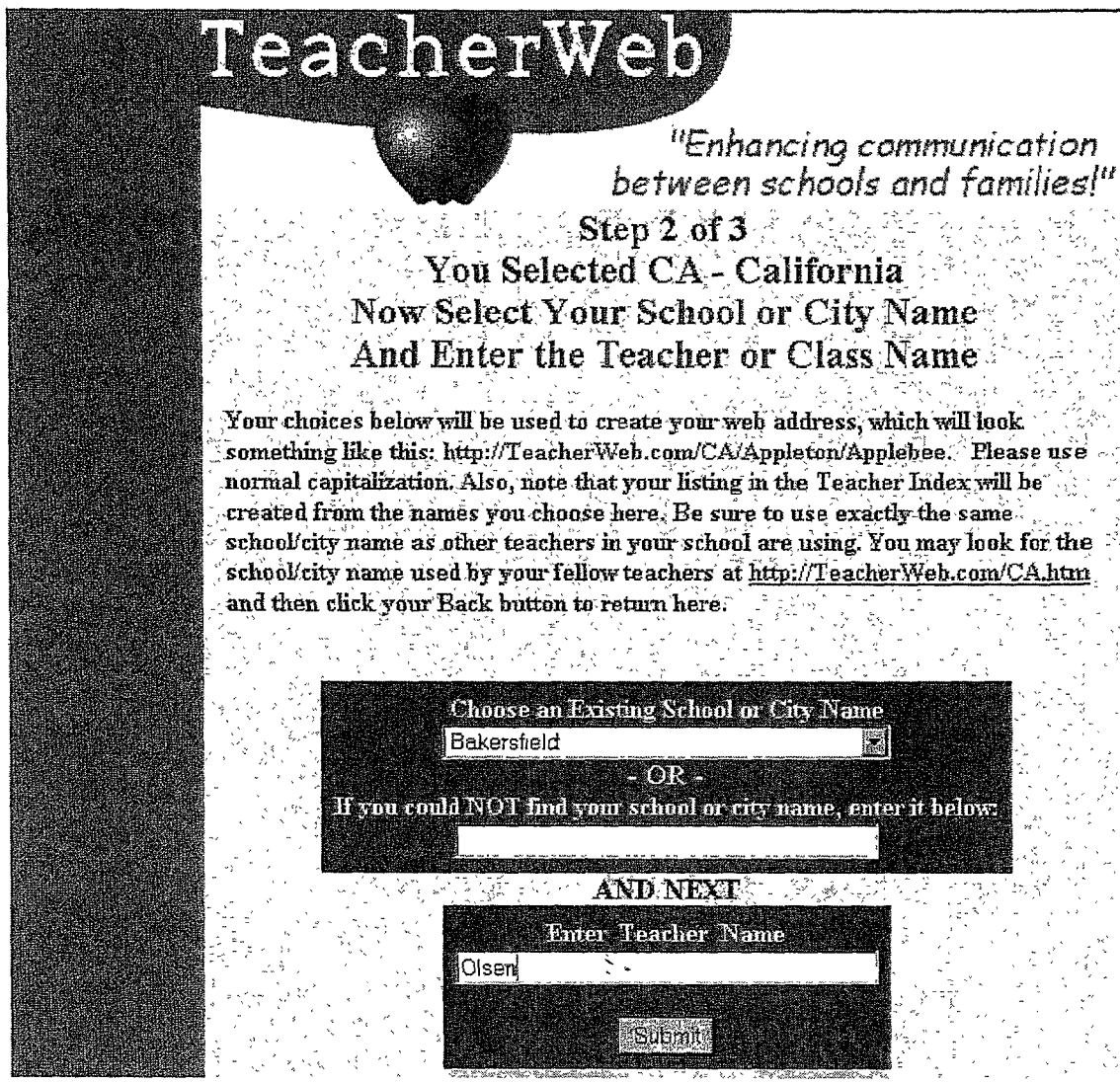

In a preferred embodiment, a starting Web is designed based on the requirements provided by a user or a community of users. This design includes determining what types of pages are to be in the Web, the specific design of these pages and the relationships among these pages (e.g., navigation bars). FIG. 1A is a non-limiting example of a home page for a Web created for a community of teachers. It is a generalization and each teacher's customizations transform this general Web to become a personal Web for each individual teacher of this community. For the non-limiting example of FIG. 1A, a teacher is provided with a Web personalization page, as illustrated in FIG. 1B. In this example of a teacher Web, a teacher needs only to provide three inputs, namely, Page title, e-mail Address, and Background/Divider Line. In an alternative embodiment, this Web personalization page is preceded with at least two screens, shown in FIGS. 1C–D, in which the user chooses a URL, i.e., Web address, by selecting State/Country Code, City/School Name and teacher/Class Name. The personalization scenario is customized to the community of users being supported, in a preferred embodiment, and for a non-limiting example of a geographically distributed community of teachers these two screens sufficed.

A starting UUWS design includes all the options that are to be available to the users in this community. It should be noted that there are really two classes of users: the teachers and their students. Only the teachers can customize the Web and its constituent Web pages. In the non-limiting example of FIG. 1A, there are several pages of the same type, e.g., Announcements and Homework are the same type of UUWP. The starting design for this example Web is a Home Page and several basic pages, including: Single Variable Text Box page (Homework and Announcements 10), Multiple Variable Text Box page (About The Teacher 11), Index List and Entries page (FAQ 12), Table page (Calendar 13), Links page (Links 14), and Uploaded File page (Photos/Docs 15). A user of this Web may add other page types.

In a preferred embodiment, once the requirements have been provided by the user community, they are analyzed by a Host Web designer, augmented with page types, and stored in a parameter file at the Host. The specialized UUWS/UUWP software is then modified, if necessary, at the Host and executed to read this parameter file to generate an HTML file for each page selected by the Host designer in response to user community requirements. This specialized software is highly parameterized so that virtually every aspect of the Web can be changed by changing a parameter in the parameter file and re-executing this software to generate an updated Web. An example of this software is included in the CD-rom appendix for the non-limiting teacher community example of FIG. 1A.

This highly parameterized software is created by a Host designer not only to generate a starting Web, but it also is the software that is employed by the user to generate updated Webs, such as customizations to the starting Web. That is, this software is employed to generate all subsequent Webs required by user updates of either or both of the UUWS or its UUWPs. A person skilled in the art will realize that this software can take several forms ranging from totally custom built to table driven and can be implemented in any appropriate language. No specific implementation is implied or required by the present invention or any of its embodiments.

Figure 31:
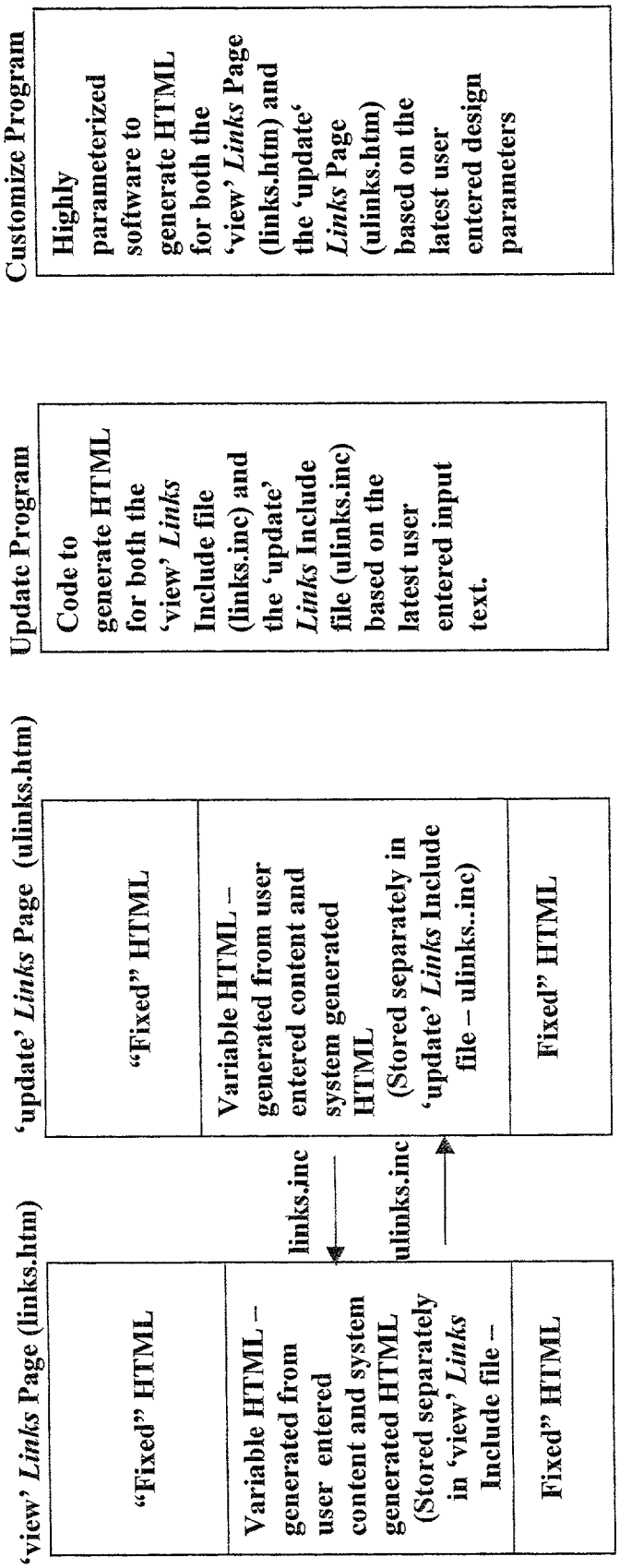
FIG. 31 illustrates the basic architecture of a UUWP for one generic type of page, namely a Links page.

In this preferred embodiment, this highly parameterized software runs on a Host system and is available via the Internet to an authorized user with a Web appliance. This parameterized software is to be used to create and update a personal Web based on the user community model this software incorporates. That is, not only is there a user-specific parameter file but the software that reads the user parameter file may be enhanced to meet new requirements from a user or user community. In a preferred embodiment, this specialization is accomplished by the Host and not by the user or user community. Customization or update by the user or user community is a separate activity and is accomplished for each UUWP or 'view' page generated for a UUWS, by the parameterized software creating a companion or 'update' page to provide a mechanism that enables the user to update the contents of the 'view' page. Each 'update' page is tailored to just display input boxes for the variable, i.e., updateable, areas in its associated 'view' page. FIG. 31 illustrates this architecture for a preferred embodiment, using one generic page type as an example, i.e., a Links page type.

In a preferred embodiment, in addition to a starting UUWS design, the Host can provide customized functionality for a user or community of users. For a non-limiting example of a teacher Web, an automated UUWS index has been provided. When many unsophisticated users build personalized Webs that are to be viewed by equally unsophisticated viewers, it can be a challenge for the viewers to find a particular user's, e.g., teacher's, Web. To aid user's in finding a particular teacher's Web, a three level hierarchy in the URL has been implemented with an index that is built and maintained automatically at the Host. In the non-limiting example of a teacher Web, all teachers create their own URL. All Webs have the base address of http://TeacherWeb.com. The first level is chosen from a fixed list of two letter State/Country codes. The second level is the school name or school's City name and is entered by the teacher. The third level is the teacher name or class name or some other teacher-specified identifier. A teacher's URL would appear as, for example, http://TeacherWeb.com/MA/Harvard/Jones.

A corresponding three level index system allows the teacher's students to locate their teacher. The student first selects the State/Country code for the student's school, as illustrated in FIG. 28. A list of school/City names is then presented and the student selects the one that's appropriate for the student's school, as illustrated in FIG. 29. A list of teacher/class names is then presented and the student selects the appropriate entry, as illustrated in FIG. 30).

In one embodiment, the highest level of index is a static Web page with a list of State/Country codes. The viewing student selects the State/Country code that is appropriate for the student's school and is taken to a page that lists all School/City names for the selected State/Country. Experience has shown that there are only about one hundred State/Country codes that make up the highest level and the corresponding set of School/City names is relatively static, for this non-limiting example of a maturing system according to the present invention. Therefore, for the second level of the index, a Web page is created at the Host for every State/Country code one or more times per day. That is, the Host system according to one embodiment of the present invention creates one hundred Web pages each with a list of the School/City names for a specific State/Country code. The server runs this program to create updated second level index Web pages one or more times per day.

For the second level, building one hundred Web pages to hold the State/Country lists of school name/City names one or more times a day is much more efficient than dynamically rebuilding a specific page for every viewer's request, which could amount to tens of thousands per day. Also, by having an actual Web page at a fixed URL which represents the second level of the hierarchy allows students to skip the first level of the search and to start at the State level, e.g., http://TeacherWeb.com/CA.htm. This could not be done if the second level were dynamically constructed.

The lowest level of the search, i.e., finding the appropriate teacher/class, is accomplished by dynamically building the appropriate Web page with the appropriate teacher list. When the student makes a second level selection, an ASP program is called to dynamically build the list of appropriate teachers/class names for the selected School/City name. Dynamically building this level of the index is accomplished in an alternative embodiment because volatility at the third level is much greater than at the second level. Every time a teacher creates a Web, deletes a Web or changes his Web address, the lowest level of the index is affected.

The three level hierarchy of the URL is implemented as a three level hierarchy of disk directories. So, for any level, building a list that represents the appropriate subset of the next level in a hierarchy, simply entails reading the appropriate disk directory entry which is very fast and may well already be in memory.

2. The Individual UUWPs of a UUWS

In a preferred embodiment, the objective of UUWPs is to create an extensible set of user updateable Web pages that can be easily maintained by lay users. In order to achieve this objective, UUWPs, in a preferred embodiment, have the following usability characteristics:

- a third party or Host designer creates a master version of parameterized software for the initial Web and all its variations and the user creates the initial set of UUWPs by selecting a UUWS type and, perhaps, providing a name and email address;
- to create and update a UUWP, the user needs only a browser, access to the Internet, and the Web address of the UUWP Host;
- to create and update a UUWP, the user needs only knowledge of how to click on a hyperlink, type in text and click on a Submit button;
- a UUWP is really two pages—the page that everyone sees called a 'view' page and the tailor-made companion 'update' page into which the user enters information to update the contents of the corresponding 'view' page;
- to update a UUWP a user directly enters text, and uploads text and image files that can be viewed on the Internet; and
- UUWPs enable lay users to do a specific, constrained task (e.g., communicate with students) that requires frequent posting of new information on the Internet within a well-defined structure.

In a preferred embodiment, an extensible set of several different generic types of UUWPs is provided to achieve these usability objectives, including:

Single Updateable Text Block;
Multiple Updateable Text Blocks;
Links;
Index List and Entries;
Table;
Uploaded File;
Uploaded Web Page; and
Integrated Uploaded Web Page.

The Basic Update Technique—Once a starting UUWS has been generated, a user can begin entering variable information into its UUWPs. In a preferred embodiment, the fixed part of each UUWP is stored in a file that is completely separate from the variable part of each UUWP, which is also stored in a file. The logic to update the variable information is made simpler as it needs to know nothing about the fixed part of the Web page. The update is much faster as there is no need to read and write the old Web pages when the variable part is the only part being updated. Using this approach, it is also much easier to update the fixed part of all current users' UUWPs to add new functionality and/or fix problems. The separation is achieved by storing all the fixed information for a UUWS in a parameter file that is used to generate the HTML for the fixed part of the UUWPs of a UUWS. All the variable information is stored in an Include file that is used to insert the variable information into each UUWP's structure, for a given UUWS.

In a preferred embodiment, the architecture of a UUWP is open and allows a user to add HTML to 'update' page input text blocks. That is, when a user enters text into an 'update' page input text box, the user can include HTML tags and they will be included in the 'view' page for interpretation by a browser. No debugging of user-provided HTML is provided. However, this feature is provided as a courtesy to users who may want to bold headings and italicize text for emphasis.

a. Single Updateable Text Block Page—In a preferred embodiment, the same Include file is used to insert the variable information into both the HTML file for the 'view' page and the companion 'update' page. This approach reduces the complexity of the system and method of the present invention, thereby reducing the time to accomplish user updates.

Figure 2A:
FIG. 2A is a 'view' Homework page for an example of a teacher Web, where the Homework page is an instance of a Single Updateable Text Block page type.

For the non-limiting example of a teacher Web, as illustrated in FIG. 1A, the 'view' Homework page is an initially empty page, as illustrated in FIG. 2A. To enter a current homework assignment for Jane Teacher, Jane Teacher clicks on the top divider line to display the companion 'update' Homework page, illustrated in FIG. 2B. The companion 'update' Homework page always shows the current state of the variable text 20 in the corresponding 'view' Homework page. Therefore, in the example illustrated in FIG. 2A, the companion 'update' Homework page will contain an initially empty input text box 21, as illustrated in FIG. 2B. When, as illustrated in FIG. 3, Jane Teacher enters text 30 into the input text box 21 that is to be displayed on the 'view' Homework page, the 'update' Homework page appears as a page such as the page illustrated in FIG. 3. In order to generate the updated 'view' Homework page, Jane Teacher enters a password 31 and clicks the Submit button 32. If the password is correct, the text 40, exactly as it appears in the input text box 21 of the 'update' Homework page, is added to the 'view' Homework page, as illustrated in FIG. 4.

For the Homework page, the simplest type of UUWP, the Include file contains the text string that is entered into the 'update' Homework page's input text box 21 and that is displayed as the homework assignment 40 in the 'view' Homework page. However, for different types of pages, in a preferred embodiment different techniques may be used, depending on the characteristics of the page type, as described in the following sections. A person skilled in the art will realize that the technique chosen for a given generic page type can be other than the approaches discussed herein and it is within their skills to select an implementation toolset to be used which does not depend on the concept of separating fixed from variable parts of UUWPs.

The Announcement page of the non-limiting example of FIG. 1A, is the same type of generic page as the Homework page, the only difference being its name and title. It is a Single Updateable Text Block box page.

b. Multiple Updateable Text Blocks Page—A second type of page supported by a preferred embodiment, is a page with multiple variable text entry boxes. The About The Teacher page of FIG. 1A, illustrated in detail in FIG. 6, is an example of a Multiple Updateable Text Blocks page in which there are six separate variable text entry boxes 50 distributed throughout the fixed framework of the About the Teacher page. The variable information is placed into six separate Include files that are merged with the HTML files that represent the fixed parts of the 'view' About The Teacher page and the 'update' About The Teacher page. This technique of multiple Include files extends the corresponding technique for the Single Updateable Text Block page.

Each of these variable text boxes is initially empty, but the fixed headings of each section are visible in the initially empty 'view' About The Teacher page. In a preferred embodiment, these variable sections can be seeded with standard default values.

An example of an 'update' About The Teacher page including input text boxes 50 that contain user entered text, and the resulting 'view' About The Teacher page are illustrated in FIG. 5 and FIG. 6, respectively.

c. Links Page—An example of another generic type of page, supported in a preferred embodiment, is a Links page containing multiple hypertext links. In a preferred embodiment, the 'update' Links page has at least one input text box for specifying and producing at least one hypertext link and a name/description-for each link. The Include file required for the 'view' Links page differs from the Include file required for the 'update' Links page and separate Include files are created for each., see FIG. 31.

In a preferred embodiment, as illustrated in FIG. 7A, for the 'view' Links page Include file, the hypertext links are created for each plain text URL 70 that the user enters and a single, composite Include file is created to be used with the 'view' Links page. Hence, this single 'view' Links page Include file must include all the HTML for all the hypertext link HTML tags. For the 'update' Links page, a single, separate Include file is created and this Include file contains all the HTML for all of the input text boxes as well as their contents.

Four sets of input text 70 for a sample 'update' Links page and the resultant 'view' Links page are illustrated in FIG. 7A and FIG. 8A, respectively. Their corresponding HTML is illustrated in FIGS. 7B and 8B, respectively.

d. Index List and Entries Page—A typical example of this type of generic page is a Frequently Asked Question or FAQ page, illustrated in FIGS. 9A and 10A. In a preferred embodiment, the 'update' Index List and Entries page has at least one pair of input text boxes for specifying and producing at least one Index and corresponding Entry. Similar to the Links page, the Include file required for the 'view' Index List and Entries page is quite different from the Include file required for the 'update' Index List and Entries page and separate Include files are created for each.

Rather than the Include files for and Index List and Entries page just containing the user entered text, they also contain HTML. An ordered list is created for the Index List and Entries page Include file, that acts as an index to, for example, Question and Answer pairs. This ordered list is generated from the plain text that the user enters. For performance reasons, a single Include file for the 'view' Index List and Entries page is created from the input text strings. Hence, this single 'view' Index List and Entries page Include file must contain an ordered list that acts as an index to, for example, all Question and Answer pairs.

Similarly, it would degrade performance to have to create, read and write multiple Include files for the 'update' Index List and Entries page, so a single, separate Include file is created for the 'update' List and Entries page. Hence, this single Include file must include all the HTML for all of the input text boxes as well as their contents.

The three sets of input text boxes for an example 'update' List and Entries page and the resultant 'view' List and Entries page are shown in FIG. 9A and FIG. 10A, respectively. The HTML corresponding to these pages' variable sections is shown in FIGS. 10A and 10B, respectively.

e. Table Page—In a preferred embodiment, each 'update' Table page has at least one row comprising a text box and a drop down list box for specifying and producing a corresponding at least one event with Day, Month, Year and Event Description. Similar to the Links page, the Include file required for the 'view' Table page is quite different from the Include file required for the 'update' Table page and separate Include files are created for each.

In a preferred embodiment, the Table page is used to create a user input Calendar page. The Calendar page is an example of associating a function with an instance of a generic page, in this case a sort function. All the user entries are sorted into chronological order and then HTML is generated for each entry in chronological order. A Heading for each month is generated for each "Month" that has valid entries. All the Day entries for a specific Month are displayed under the specific Month's heading. The multiple parts of the Calendar page and the specific event entries are displayed in a (HTML) Table for alignment. This method is used since screen space needs to be used efficiently. No space is wasted to explicitly display days/dates in a 'view' Calendar page for which there are no events. All the possible days/dates do appear in the 'update' Calendar page.

In a preferred embodiment, a single composite Include file is created for the 'view' Calendar page. It contains the HTML to display the input text strings, in their sorted and combined form, in a well-aligned table. Similarly, a single and separate Include Me is created for the 'update' Calendar page and this single file contains all of the HTML for all of the input text boxes and drop down list boxes as well as their contents.

The input text boxes 110 and drop down list boxes 111 for an example 'update' Calendar page and the resultant 'view' Calendar page are illustrated in FIG. 11A and FIG. 12A, respectively. Only seven days of events are specified in the non-limiting illustration of FIGS. 11A and 11B. The generated HTML for each of the 'update' and 'view' Calendar pages is shown in FIGS. 11B and 12B, respectively.

f. Uploaded File Page—The 'update' Uploaded File page differs from other 'update' pages because it enables the uploading of files (in addition to user entered text). The user can upload graphics files and other Web pages (HTML files) that can be viewed directly using the viewer's browser. The user can also upload a wide range of document types that can be viewed directly by the user if his workstation has the prerequisite "viewer" software, e.g., Adobe Acrobat Reader for viewing PDF files.

In a preferred embodiment, the 'update' Uploaded File page has at least one pair of input boxes for specifying at least one file to be uploaded from the user's workstation to use for display by the Host in the user's Web. In a similar manner to the Links page, the Include file required for the 'view' Uploaded File page differs from the Include file for the 'update' Uploaded File page. Referring now to FIG. 13A, the 'update' Uploaded File page uses a special kind of input box (Type=File), whereby the user can either type in the file path and file name 130 of a file that exists on the user's workstation that is to be uploaded to the Host or the user can employ the associated Browse button to select a file to be uploaded to the Host.

The input text boxes for a sample 'update' Uploaded File Page and the resultant 'view' Uploaded File page are illustrated in FIG. 13A and FIG. 14A, respectively. The corresponding Include files are partially illustrated in FIG. 13B and fully in FIG. 14B. Five files have been selected to be uploaded in the illustrated examples. This number is by way of example only and is not meant in any limiting sense.

g. Uploaded Web Page—Similar to the Uploaded File page, the Uploaded Web page is qualitatively different than other generic page types in that, in addition to accepting user entered text, it also accepts and uploads files specified by the user. The Uploaded Web page shares some properties with the Uploaded File page. It uses the same pairs of at least one input text box 150 and input file box 151 as the Uploaded File page. However, only HTML pages may be uploaded. The Host program accepts the uploaded HTML file and adds the uploaded Web page (HTML file) to the user's UUWS. The system and method of the present invention integrates the uploaded Web page into the UUWS by adding a hyperlink graphic icon and hypertext link to the user's Home Page (Oust as the other pages described above have their hyperlinks on the Home Page) and by adding a link to the newly uploaded page to all the other pages' navigation bars. Also, the user will be able to change the graphic icon for a Uploaded Web page and/or reorder the position of the icon on the Home Page in the same manner the user can change/reorder the icon associated with all the other 'native' UUWPs. The Renaming and Deleting of this page is different than say the Homework page and instead follows the model of Renaming and Naming used within the Photos page to Rename and Delete upload image files.

Thus, the user can add Web pages that were created outside the system and method of the present invention to a UUWS and have these 'non-native' pages integrated into a UUWS.

Available browsers do not provide capabilities for text formatting (e.g., changing font, text color) or spell checking within an input text box. Therefore, the ability to use all the text formatting and spell checking, etc. capabilities of a word processor greatly enhances what a non-sophisticated Web creator can do. In addition, text formatting and spell checking require the immediate interactivity that can only be provided by a workstation-side program such as a personal word processor. Further, spreadsheet products now allow the UUWS user to create a wide range of table-based documents.

The Uploaded Web page input boxes 150 151 are shown in FIG. 15A. The Page Name that the user enters for each uploaded page will be used as the page name on the Home Page and in the navigation bars of the UUWS. The pages that a user can upload can take any form and a spreadsheet page is shown in FIG. 16

By placing a marker, "UUWP", into the HTML for the Web page to be uploaded, the user is able to update text in the specified area of an Uploaded Web page using the same techniques as for updating the text in a Multiple Updateable Text Blocks page, described above. In other words, the user goes to the companion 'update' page and enters text to replace the UUWP marker in a standard input text box. The user can then replace and/or edit that text repeatedly, as required.

There is one fundamental difference between updating variable text on an Uploaded Web page and updating a Multiple Updateable Text Blocks page. When the user creates a Web page and places the text marker 'UUWP' therein, the format of the text marker is not limited (e.g., the user may specify any font face, font size, bold, italic, color or make it part of a table or list). The replacement text will take on the same characteristics as was given the "UUWP" marker text.

h. Integrated Uploaded Web Page—With an Integrated Uploaded Web page, the integration of 'non-native' documents is taken one significant step further. The body/content of the document is extracted from the HTML file and is put into the standard UUWP format. Hence, in contrast to the Uploaded Web page approach where the uploaded HTML file is added to the Web "as is", an Integrated Uploaded Web page will look like all the other 'native' pages in the user's UUWS. A 'view' Integrated Uploaded Web page will have the same background, header, footer, divider line, and navigation bar as the other UUWPs of a UUWS.

All the advantages of being able to use word processors, spreadsheet programs and other document creation programs that the user is already familiar with to create content are valid for Integrated Uploaded Web pages. In addition, this content can be added in such a way as to look like all the other UUWPs of the UUWS and have the same general functionality as all the other UUWPs.

Figure 17B:
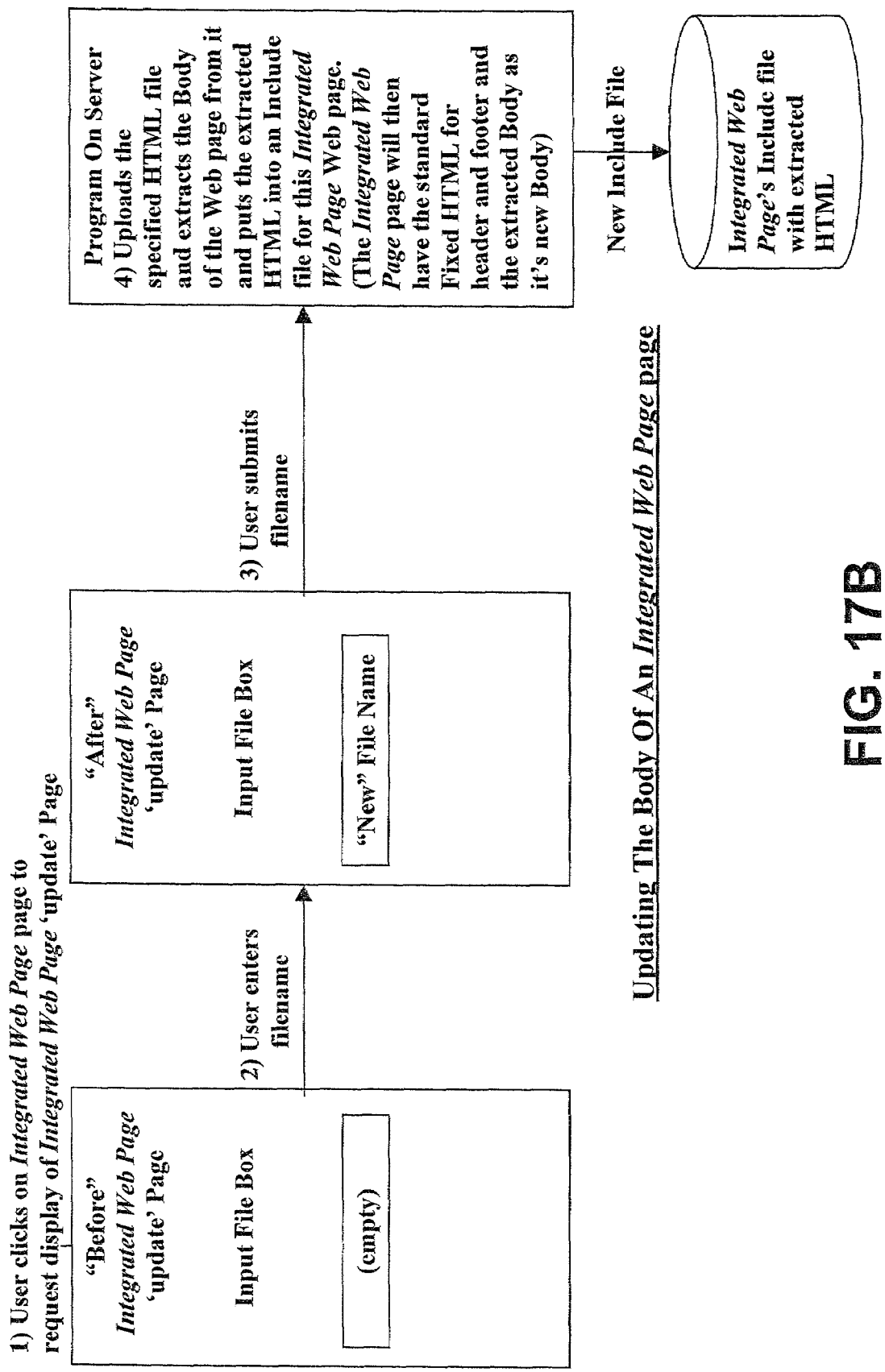
FIG. 17B is schematic which shows the steps for updating an instance of an Integrated Uploaded Web page.

The Integrated Uploaded Web page of FIG. 17A corresponds to the Uploaded Web page illustrated in FIG. 16. The data flow and logic flow for updating an Integrated Uploaded Web page are shown in FIG. 17B. The user specifies an HTML file to be uploaded and the system extracts the body of the HTML file and creates an Include file that will be included with the basic UUWP page structure (e.g., the standard page header and footer).

3. Customization

Separate from the user process of updating the variable text in UUWPs, is the process of customizing a UUWS. Many of the various customizing options entail updating multiple pages or all pages in a UUWS. Some examples of customizing include:

Add, delete and/or rename Web pages: This affects all UUWPs in a UUWS including the 'update' pages as every page's navigation bar has to be updated. Also, the Home Page has to be updated to show modified links.

Change background and/or divider lines: This affects all UUWPs in a UUWS, including the 'update' pages, as all pages have the same style including background and divider line.

Change e-mail name and/or add or delete the e-mail facility. This affects all the 'view' pages as well as the Home Page In a preferred embodiment, each UUWS has a tailored-made customizing function so that just those options that are relevant to the specific UUWS are presented to a user. When modifying the design of a UUWS, the user is never in the mode of dealing with the specification of an entire UUWS. The user just updates individual parameters (e.g., the e-mail icon). In a preferred embodiment, these parameters are presented as a set of selectable options. For example, a select set of backgrounds is presented to the user—just those backgrounds that are compatible with the rest of the design elements of the user's UUWS. If the user wants to update the graphic icons that represent the various UUWPs in a UUWS, the program just presents the information that's relevant to the subset of UUWPs that are actually currently a part of the user's UUWS.

All the parameters that define the changeable design features of a UUWS are held in a single file, in a preferred embodiment, for each UUWS. For customizing, it is not the HTML that defines the UUWPs of a UUWS, but the parameter file and the parameterized software that contains its fixed structure. In addition, the parameterized software that effects the change to a UUWS is Hosted and accessible over the Internet. All Hosted UUWSs share the same parameterized update software.

The combination of the parameter file and-the parameterized software make it simpler and faster to distribute new functions and problem fixes to all UUWSs. For example, if it were desired to allow users to increase to the number of links on their Links page, it would ordinarily require distributing a release to all users. However, with a UUWS, only the Hosted parameterized software has to be changed, and the change takes effect the next time each user customizes a UUWS, for that Web. Also users can be asked to click the Re-Generate Web button to regenerate their UUWSs for other reasons.

Also, if an error is found in the parameterized software, it can be fixed immediately for all users as all users share the same parameterized software.

Often, if a dozen software updates are made, as many as a dozen different versions of user UUWPs can exist. Hence, it can be difficult to provide backward compatibility and support all possible old versions of UUWPs. However, this does not affect a UUWS because the parameterized software that generates a UUWS never looks at the existing UUWPs, it just looks at the parameter files.

Similarly, all UUWS specifications are in a common file format and all those files reside at the Host and are easily and immediately accessible. Hence, new parameters can be added to all these files and errors can be corrected in all these files at the same time.

Customizing Details—The system and method of the present invention allows users to customize the appearance and functionality of their UUWSs using a subsystem that is totally separate from the subsystem that allows users to update the contents of their UUWPs. However, this UUWS customizing subsystem employs the same metaphor and same type of interface that the user is already familiar with for updating UUWPs.

Each UUWS has it's own Update Index Web page, a special generic Web page type. As illustrated in FIG. 18, the Update Index Web page points to all the 'update' pages that are associated with 'view' pages of a given UUWS and that are used to update the contents of these UUWPs. In addition, the Update Index Web page has an "Other Changes" section, as illustrated in FIG. 19, that is the user's gateway to customizing a UUWS.

In a preferred embodiment of a UUWS, all the customization Web pages are shared by all users of any UUWS. This allows the customization subsystem to be easily updated by changing the customization Web pages at the Host. Customization Web pages are not static Web pages, but rather each is a type of generic page for the look and feel of an instance of another generic type of UUWS. The customization page for a UUWS is shaped to match the user's UUWS when a user requests it. Hence, changes can be distributed to the user without the user having to get a new release or download patches, fixes, etc. If a new customization feature is to be added to all UUWSs, the shared customization Web pages can be added to and the new customization feature is available the next time any user goes to use the customization Web pages.

In a preferred embodiment, even though all uses share the same customization Web pages, each customization page is highly parameterized and dynamically changed when requested by any individual user. When a user requests a particular type of customization, the system displays the appropriate (shared) customization Web page. The program obtains the current state of the user's UUWS from the user's parameter file and shapes the customization Web page according to the current state of the user's UUWS. Consequently, each user sees an individualized version of the shared customization Web page(s) that only contains information that is relevant to the current state of the user's UUWS.

As an example, in a preferred embodiment, there is a section of a customization Web page that allows the user to specify which graphic icon will be used on the Home page to represent a specific 'view' page. In a preferred embodiment, the user can have at least one of each of a fixed number of page types on a Home page. However, when a UUWS is first generated, only a specific number of pages are generated which is usually less than this fixed number. So for a new UUWS, only these initial pages are listed in the "Change Graphics Icon" section.

Customization Web Pages—There are several types of customization Web pages:
   Update Index Web Page
   Change Graphics
   Change Name/e-mail Address
   Add/Delete/Rename Pages
   Change Fixed Text
   Customize Home Page a. Update Index Web Page—Each Web has it's own Update Index Web Page. This customization page, illustrated in FIG. 18, serves as the gateway to the actual (shared) customization Web pages. There are five customization buttons that lead to five different types of customization pages, as illustrated in FIG. 19. In addition, there is a Regenerate Web and a Delete Web button.

b. Change Graphics—In a preferred embodiment, the Change Graphics customization Web page has three sections—one for changing page background, one for changing divider lines and one to specify graphic icons that represent the UUWPs on the Home page and also to change the graphics that appear on each UUWP, that is, if the UUWP type definition includes a graphic icon. The backgrounds and divider lines can be viewed by clicking on their name. There is a separate library for previewing other graphics and the user can add personal graphics to the graphics library.

In a non-limiting example of a teacher UUWS, Jane Teacher changes the background from the original plain white to a science motif, as shown in FIG. 20. Then, as shown in FIG. 21, Jane Teacher changes the divider lines from the original red bar to a calculator design. Further, as shown in FIG. 22, Jane Teacher adds a photo of herself to the About The Teacher page.

Figure 23:
FIG. 23 is an example of an update About The Teacher page that implements the updates illustrated in FIGS. 21 and 22 and may be contrasted with the "before" About The Teacher page shown in FIG. 5.

To effect the changes, Jane Teacher scrolls to the bottom of the page and enters a password and clicks on the Submit button (area not shown). Submitting these changes causes the parameters in Jane Teacher's parameter file to be updated and her UUWS to be regenerated. All her UUWPs will have the newly specified background and divider lines. The new About the Teacher page is shown below in FIG. 23 and may be contrasted with the "before" UUWP shown in FIG. 5.

c. Change Name/Email Address—This customization page allows a user to change the title that appears at the top of the user's UUWPs, to change e-mail address, to change whether or not a viewer can e-mail the user from the UUWPs and even change the name of the e-mail facility itself (i.e., the name for the e-mail facility that's used in the navigation bars). FIG. 24 illustrates the customization Web page for making these changes to a UUWS.

d. Add/Delete/Rename Pages—As illustrated in FIG. 25A, in a preferred embodiment, a user can add or delete pages from the user's UUWS. There are currently several generic types of UUWP that the user can choose from to include in a UUWS. The Uploaded File and Uploaded Web Page types are not shown in FIG. 25A as the user must request that these be "turned on" for a UUWS and in this case provide additional proof that the user is a bona fide teacher as both these types provide the ability to upload files. In addition four types, Single Text Block, Links, Table, and Uploaded Web Page, allow multiple pages of that type.

The user checks or unchecks a page's check box to add or delete a page for a UUWS. The user can edit the UUWP name in the text box to change the UUWP name for a UUWS. As with all the other pages, this page initially shows the current state of the UUWS.

In the preferred embodiment illustrated in FIG. 25A, the user is shown all allowable UUWPs regardless of which UUWPs are actually a part of a UUWS thereby allowing a user to see which UUWPs can be added to a UUWS. In FIG. 25A only a partial listing of the "extra" UUWPs is shown.

Figure 25B:
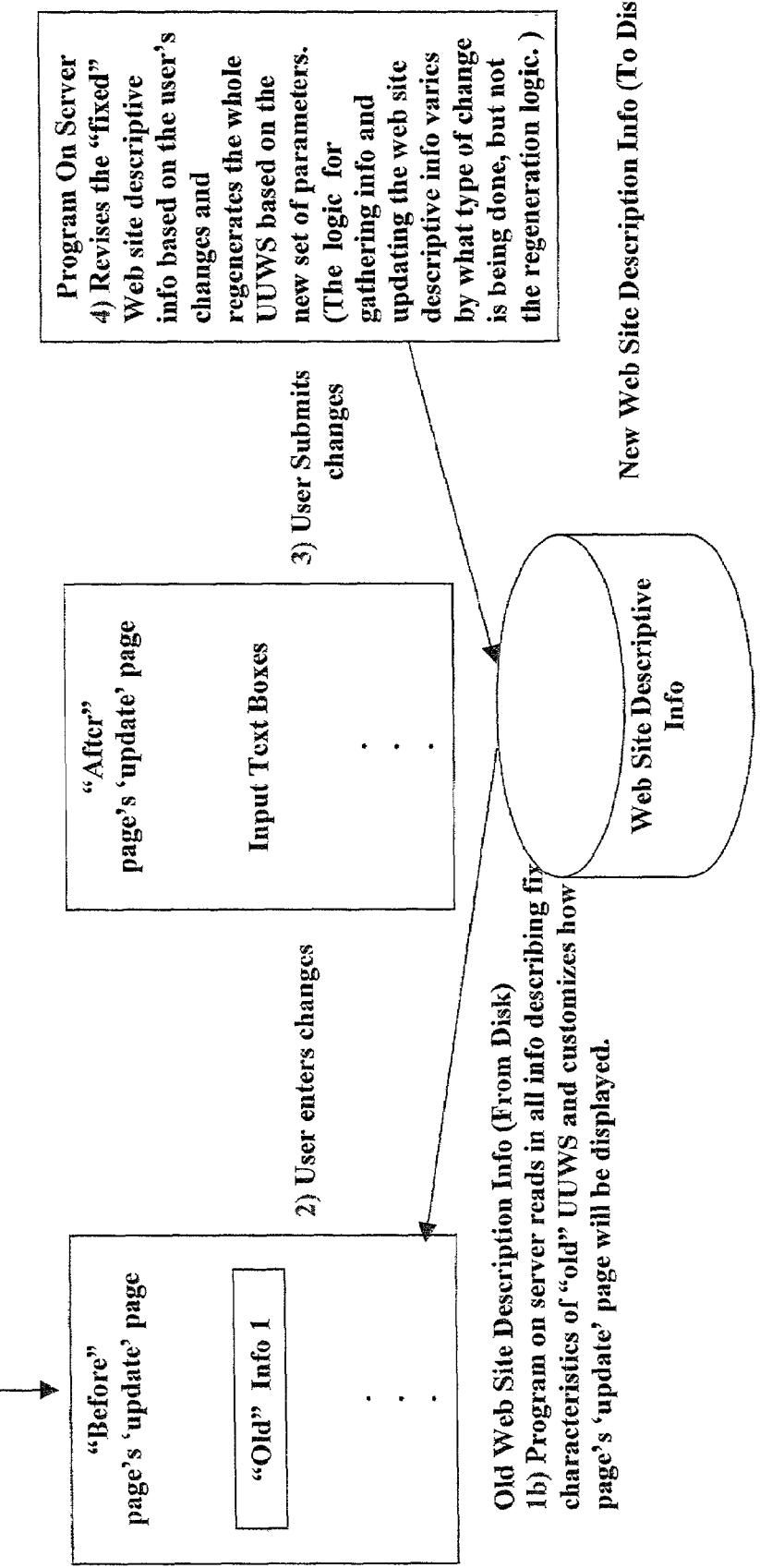
FIG. 25B is a schematic that shows the steps involved in customizing an instance of a UUWS Web site. The user enters new choices for the "fixed" part of the Web site (e.g., the user may choose to delete an existing Web page from the Web site.)

An overview of the pages update process for a preferred embodiment is illustrated in FIG. 25B.

e. Change Fixed Text—There is some fixed text on some of the UUWPs. In a preferred embodiment these "fixed" features can be changed, as illustrated in FIG. 26.

f. Customize Home Page—The changes allowed using this customization Web page only affect the user's Home page. As a non-limiting example, a teacher can put a schoolhouse icon on the teacher's Home page that will serve as a link to a school's Web site. As illustrated in FIG. 27A, the user can change the banner color from the initial default to a number of colors that have been tested as being compatible with various logos and icons available for the teacher's UUWS. The user can also change the user's e-mail icon to one of a number of compatible icons. The user can select whether the page links on the Home page are graphics with text underneath or just text or just graphics. Finally, the user can rearrange the order of the page icons on the teacher's Home page, as illustrated in FIG. 27B.

Thus, virtually every aspect of a user's UUWS is customizable except for the basic structure of a UUWP page type.

In a preferred embodiment, after making customization changes a user must regenerate a UUWS by Submitting those changes (Note: When one Submits a Customization Change, the system and method of the present invention automatically regenerates the fixed part of the user's Web. The user does not need to click on the Re-Generate Web button. That button is only there for special purposes such as when a bug fix is installed and user's optionally regenerate their UUWS to incorporate the fix). The Re-Generate Web feature is an important feature that provides another efficient way to distribute new functionality to all users or to fix problems for all users. The Re-Generate function causes the parameterized software, which resides at the Host, to rebuild the user's UUWS employing the user's parameter file. When the user UUWS is rebuilt, the newly regenerated UUWS reflects any changes to the parameterized software.

In a preferred embodiment, a user may delete a UUWS. When the user clicks the Delete Web button and enters his password, all traces of his UUWS are deleted from the Host. A backup is maintained for a designated period of time at the Host.

Although several embodiments of the invention have been disclosed, it will be apparent to those skilled in the art that various changes and modifications can be made which will achieve some of the advantages of the invention without departing from the spirit and scope of the invention.

For example, Web Quests can be supported by the system and method of the present invention. For a non-limiting example of a teacher Web, a Web Quest can be defined as an assignment by a teacher including a number of starter URLs. The Links page can be used, as is, to do a Web Quest.

As another example, new UUWP page types that are composites of the enumerated Web page types can be used in a UUWS.

As another example, areas of Webs can be provided password protected access. This allows, for a non-limiting example of a teacher Web, a given teacher's Web to be accessible only to the students that are enrolled in a given teacher's class and their parents.

As another example, pages can have associated subscriber lists and when any such page is updated, the subscribers can be notified. For a non-limiting example of a teacher Web, when a teacher posts a new homework assignment all the students (and possibly their parents) can receive an e-mail notification.

As another example, Web page types do not have to be updateable by the Web owner. A Chat Room page is a type of page that would not be updated according to the UUWP model, i.e., there is no 'update' page corresponding to the 'view' page.

As another example, third party Web page add-ons can be provided such as hit counters, guest books, etc. Owners of UUWSs can use the scripts and HTML provided for these add-ons to add these capabilities to their UUWPs by inputting the scripts and HTML in the text content input boxes on their 'update' pages.

As another example, an alternative preferred embodiment employs compiled code that incorporates the parameters of a UUWS and its constituent UUWPs.

Finally, cookies can be employed to identify a UUWS user.

These and other obvious modifications are intended to be covered by the following claims.

A compact disc containing a copy of the program code (that begins on the next page) has been deposited with the USPTO and is hereby incorporated by reference. The compact disc has one file in MS-Word entitled "TeacherWeb Code Submitted with Patent" 71 KB in length and the disc labeled "COPY 1" was created on Jul. 10, 2006 to file the program code electronically.

Code for "Homework" Type Page

Code to generate or regenerate the Homework page based on default parameters and/or user edited parameters. The routines called by UHomework are listed below it. The code for the general framework of the program which gathers input from the user and which is shared by all pages, but which is not central to the patentable ideas is not shown.

```
Public Sub UHomework( )
'This routine writes out the HTML for the
'Homework page
    On Error GoTo Skip
    FileOutNo = FreeFile
    'Open a new file to build the updated homework page
    Open fpath & "homework.stm" For Output As FileOutNo
    'Set title variable to be used in creating header
```

-continued

```
        Title = txtPublicName & "TeacherWeb" & txtHomework
        'Create and write out common header
        CreateHeader "uhomework.stm"
        Print #FileOutNo, "<tr><td colspan=""2""><br><h2>" & txtHomework &
"</h2></td></tr>"
        Print #FileOutNo, "<tr><td width=""600"">"
        Print #FileOutNo, "<pre cols=71>"
        Print #FileOutNo, "<!-- #include file=""Homework.inc"" -->"
        Print #FileOutNo, "</pre></td></tr>"
        'Create and write out common footer
        CreateFooter "h"
        On Error GoTo Skip
        Close FileOutNo
        'Open a new homework include page
        If blnNoIncludeFile = False Then
            FileOutNo = FreeFile
            Open fpath & "Homework.inc" For Output As FileOutNo
            'Initialize it
            Print #FileOutNo, ""
            'Write it out and close it
            Close FileOutNo
        End If
        On Error GoTo Skip
        Close FileOutNo
            Exit Sub
HErrorReturn:
            'On Error Resume Next
            Close FileOutNo
            Resume OutF
OutF:   Exit Sub
Skip:
            Resume HErrorReturn
End Sub
Public Sub CreateHeader(strPageU As String)
            'This routine writes out the common header HTML
            'for all of the "view pages"
            Print #FileOutNo, "<!DOCTYPE HTML PUBLIC""-//W3C//DTD HTML
3.2//EN"">"
            Print #FileOutNo, "<HTML>"
            Print #FileOutNo, "<HEAD><TITLE>" & Title & "</TITLE></HEAD>"
            Print #FileOutNo, "<BODY background=""" & BackgroundFilename & """>"
            Print #FileOutNo, "<TABLE WIDTH=""640"" BORDER=""0""
CELLSPACING=""0"""
            Print #FileOutNo, "CELLPADDING=""0"" HEIGHT=""100"">"
            Print #FileOutNo, "<TR>"
            Print #FileOutNo, "<TD WIDTH=""640"" ALIGN=""top"">"
            Print #FileOutNo, "<A HREF=""http://TeacherWeb.com/""><IMG SRC =""" &
HomePictureFilename & """ WIDTH=""88"" HEIGHT=""34"" ALIGN=""BOTTOM"""
            Print #FileOutNo, "BORDER=""0"" ALT=""TeacherWeb.com""
NAME=""home""></A>"
            Print #FileOutNo, "</TD></TR>"
            Print #FileOutNo, "<TR><TD WIDTH=""640""
align=""center""><b><center><H2><a name=""Top"">" & txtPublicName &
"</a></H2></center></b></td></TR>"
            Print #FileOutNo, "</TABLE>"
            'Print out navigation bar (including only user selected pages)
            CreateNavBar strPageU
            'Print out divider line
            Print #FileOutNo, "<tr><td colspan=""2""><br><p align=""center""> <a href=""" &
strPageU & """> <img src=""" & DivLinePictureFilename & """ align=""bottom""
BORDER=""0"" alt=""Top Divider""></a></p></td></tr>"
            'Break page into separate tables
            Print #FileOutNo, "</table>"
            Print #FileOutNo, "<table border=""0"" width=""640"" cellspacing=""0""
cellpadding=""0"">"
End Sub
Public Sub CreateNavBar(strPageU As String)
            'This routine
            'prints out navigation bar (including only user selected pages)
            Dim i As Integer
'Create a table for framing the nav bar
            Print #FileOutNo, "<table border=""0"" width=""640"" cellspacing=""0""
cellpadding=""0"">"
Print #FileOutNo, "<tr><td colspan=""2""><p align=""center"">[ <a
href=""index.html"">Home</a>"
    If chkAboutTheTeacher = "Y" And strPageU <> "uteacher.stm" Then Print
#FileOutNo, "| <a href=""teacher.stm"">" & txtAbout & "</a>"
    If chkHomework = "Y" And strPageU <> "uhomework.stm" Then Print #FileOutNo, "|
<a href=""homework.stm"">" & txtHomework & "</a>"
```

-continued

```
        If chkHomework2 = "Y" And strPageU <> "uhomework2.stm" Then Print
#FileOutNo, "| <a href=""homework2.stm"">" & txtHomework2 & "</a>"
        If chkHomework3 = "Y" And strPageU <> "uhomework3.stm" Then Print
#FileOutNo, "| <a href=""homework3.stm"">" & txtHomework3 & "</a>"
        If chkHomework4 = "Y" And strPageU <> "uhomework4.stm" Then Print
#FileOutNo, "| <a href=""homework4.stm"">" & txtHomework4 & "</a>"
        If chkHomework5 = "Y" And strPageU <> "uhomework5.stm" Then Print
#FileOutNo, "| <a href=""homework5.stm"">" & txtHomework5 & "</a>"
        If chkHomework6 = "Y" And strPageU <> "uhomework6.stm" Then Print
#FileOutNo, "| <a href=""homework6.stm"">" & txtHomework6 & "</a>"
        If chkHomework7 = "Y" And strPageU <> "uhomework7.stm" Then Print
#FileOutNo, "| <a href=""homework7.stm"">" & txtHomework7 & "</a>"
        If chkAnnouncements = "Y" And strPageU <> "uannounce.stm" Then Print
#FileOutNo, "| <a href=""announce.stm"">" & txtAnnouncements & "</a>"
        If chkFAQ = "Y" And strPageU <> "ufaq.stm" Then Print #FileOutNo, "| <a
href=""faq.stm"">" & txtFAQ & "</a>"
        If chkLinks = "Y" And strPageU <> "ulinks.stm" Then Print #FileOutNo, "| <a
href=""links.stm"">" & txtLinks & "</a>"
    For i = 2 To 7
        If chkLinksN(i) = "Y" And strPageU <> "ulinks" & CStr(i) & ".stm" Then Print
#FileOutNo, "| <a href=""links" & CStr(i) & ".stm"">" & txtLinksN(i) & "</a>"
    Next i
        If chkCalendar = "Y" And strPageU <> "ucalendar.stm" Then Print #FileOutNo, "| <a
href=""calendar.stm"">" & txtCalendarN(1) & "</a>"
    For i = 2 To 7
        If chkCalendarN(i) = "Y" And strPageU <> "ucalendar" & CStr(i) & ".stm" Then
Print #FileOutNo, "| <a href=""calendar" & CStr(i) & ".stm"">" & txtCalendarN(i) &
"</a>"
    Next i
        If chkPhoto = "Y" And strPageU <> "uphoto.stm" Then Print #FileOutNo, "| <a
href=""photo.stm"">" & txtPhoto & "</a>"
    For i = 1 To 15
        If chkHTMLPage(i) = "Y" And strPageU <> "uhtmlpage" & CStr(i) & ".stm" Then
Print #FileOutNo, "| <a href=""htmlpage" & CStr(i) & ".stm"">" & txtHTMLPage(i) &
"</a>"
    Next i
        If chkPage1 = "Y" And chkHTML = "Y" Then Print #FileOutNo, "| <a
href=""page1.htm"">" & txtPage1 & "</a>"
        If chkPage2 = "Y" And chkHTML = "Y" Then Print #FileOutNo, "| <a
href=""page2.htm"">" & txtPage2 & "</a>"
        If chkPage3 = "Y" And chkHTML = "Y" Then Print #FileOutNo, "| <a
href=""page3.htm"">" & txtPage3 & "</a>"
        If chkEmail = "Y" Then Print #FileOutNo, "| <a href=""mailto:" & txtEmail & """>" &
txtEmailTeacher & "</a>"
        Print #FileOutNo, "]</strong></p></td></tr>"
End Sub
Public Sub CreateFooter(strType As String)
    'This routine writes out the common footer HTML
    'for all of the "view pages"
    'If user requested no email, then don't include email ref.
    Print #FileOutNo, "<tr><td colspan=""2""><br><p align=""center""> <a
href=""update.htm""> <img src=""" & DivLinePictureFilename & """ align=""bottom""
BORDER = ""0"" alt=""Bottom Divider""></a></p></td></tr>"
    Print #FileOutNo, "</table>"
    'This option is currently commented out
    'Select Case strGradeLevel
        'Case "Elementary"
        '   Print #FileOutNo, "<CENTER><a href=""../../../ads/" & strType &
"esbnr.htm""><IMG SRC=""../../../ads/" & strType & "esbnr.gif"" BORDER =
""0""></a></CENTER>"
        'Case "Middle"
        '   Print #FileOutNo, "<CENTER><a href=""../../../ads/" & strType &
"msbnr.htm""><IMG SRC=""../../../ads/" & strType & "msbnr.gif"" BORDER =
""0""></a></CENTER>"
        'Case "High School"
        '   Print #FileOutNo, "<CENTER><a href=""../../../ads/" & strType &
"hsbnr.htm""><IMG SRC=""../../../ads/" & strType & "hsbnr.gif"" BORDER =
""0""></a></CENTER>"
        'Case "College"
        '   Print #FileOutNo, "<CENTER><a href=""../../../ads/" & strType &
"csbnr.htm""><IMG SRC=""../../../ads/" & strType & "csbnr.gif"" BORDER =
""0""></a></CENTER>"
        'Case Else
        '   Print #FileOutNo, "<CENTER><a href=""../../../ads/" & strType &
"esbnr.htm""><IMG SRC=""../../../ads/" & strType & "esbnr.gif""></a></CENTER>"
    'End Select
```

-continued

```
    Select Case strType
       Case "h", "a", "t", "l", "f"
          Print #FileOutNo, "<p>© 2000–2001 TeacherWeb.Com"
       Case Else
          Print #FileOutNo, "<p>© 2001 TeacherWeb.Com"
    End Select
    Print #FileOutNo, "</body></html>"
 End Sub
```

The code to Generate or regenerate the associated Update Homework page and its called subroutines are shown below:

```
Public Sub UHomeworkUpdate( )
   'This routine updates the Homework Update Page based on input from the user.
   On Error GoTo HUSkip
   'Open a new update homework page to output as updated page
   FileOutNo = FreeFile
   Open fpath & "uhomework.stm" For Output As FileOutNo
   'Set title variable to be used in creating header
   Title = txtPublicName & "TeacherWeb Update" & txtHomework
   'Create and write out common header
   CreateUpdateHeader "homework.stm", "Homework"
   Print #FileOutNo, "<tr><td colspan=""2""><br><h2><b>Update " & txtHomework &
"</b></font></h2>"
   Print #FileOutNo, "<font color=""#ff0000""><b>If you have previously made changes
to this page, in this Internet session, you may have to click on your Reload/Refresh
button to see those changes reflected below and to preserve those changes as you make
new changes.</b></font></td></tr>"
   Print #FileOutNo, "<tr><td colspan=""2""><textarea wrap=""hard""
name=""Comments"" rows=""10"" cols=""70"">"
   Print #FileOutNo, "<!--#include file=""Homework.inc"" -->"
   Print #FileOutNo, "</textarea></td></tr>"
   Print #FileOutNo, "<tr><td width=""20%""><br><b>Password:</b></td>"
   Print #FileOutNo, "<td width=""80%""><br><input type=""password"" size=""20""
maxlength=""20"" name=""Password""></td></tr>"
   Print #FileOutNo, "<tr><td colspan=""2""><br><input type=""submit""
name=""SubmitHomework"" value=""Submit " & txtHomework & " Page""></td></tr>"
   'Create and write out common footer
   CreateUpdateFooter "h"
   On Error GoTo HUSkip
   Close FileOutNo
   Exit Sub
HUErrorReturn:
   'On Error Resume Next
   Close FileOutNo
   Resume OutG
OutG: Exit Sub
HUSkip:
   Resume HUErrorReturn
End Sub
Public Sub CreateUpdateHeader(strPageU As String, strValue As String)
   On Error Resume Next
   'This routine writes out the common header HTML
   'for all of the "update pages"
   Print #FileOutNo, "<!DOCTYPE HTML PUBLIC ""-//W3C//DTD HTML
3.2//EN"">"
   Print #FileOutNo, "<HTML><HEAD>"
   Print #FileOutNo, "<TITLE>" & Title & "</TITLE></HEAD>"
   If Left$(strPageU, 8) = "calendar" Then
      Print #FileOutNo, "<SCRIPT LANGUAGE=""JavaScript"">"
      Print #FileOutNo, "<!-- Begin"
      Print #FileOutNo, "function NewWindow(mypage, myname, w, h, scroll) {"
      Print #FileOutNo, "var winl = (screen.width - w) / 2;"
      Print #FileOutNo, "var wint = (screen.height - h) / 2;"
      Print #FileOutNo, "winprops =
'height='+h+',width='+w+',top='+wint+',left='+winl+',scrollbars='+scroll+',resizable'"
      Print #FileOutNo, "win = window.open(mypage, myname, winprops)"
      Print #FileOutNo, "if (parseInt(navigator.appVersion) >=4) { win.window.focus( );
}"
      Print #FileOutNo, "}"
      Print #FileOutNo, "// End -->"
      Print #FileOutNo, "</script>"
   End If
```

```
    Print #FileOutNo, "<BODY background=""" & BackgroundFilename & """>"
'Create a table for framing the header
Print #FileOutNo, "<TABLE WIDTH=""600"" BORDER=""0""
CELLSPACING=""0""
    Print #FileOutNo, "CELLPADDING=""0"" HEIGHT=""100"">"
    Print #FileOutNo, "<TR>"
    Print #FileOutNo, "<TD WIDTH=""600"" ALIGN=""top"">"
    Print #FileOutNo, "<A HREF=""http://TeacherWeb.com/""><IMG SRC=""" &
HomePictureFilename & """ WIDTH=""88"" HEIGHT=""34"" ALIGN=""BOTTOM"""
    Print #FileOutNo, "BORDER=""0"" ALT=""TeacherWeb.com""
NAME=""home""></A>"
    Print #FileOutNo, "</TD></TR>"
    Print #FileOutNo, "<TR><TD WIDTH=""600""
align=""center""><b><center><H2><a name=""Top"">" & txtPublicName &
"</a></H2></center></b></td></TR>"
    Print #FileOutNo, "</TABLE>"
    'Print out navigation bar (including only user selected pages)
    CreateUpdateHeaderNavBar strPageU
    If strPageU = "html.stm" Then
        Print #FileOutNo, "<tr><td colspan=""2""><br><p align=""center""><a
href=""index.html""> <img src=""" & DivLinePictureFilename & """ align=""bottom""
BORDER = ""0"" alt=""Top Divider""></a></p></td></tr>"
    Else
        Print #FileOutNo, "<tr><td colspan=""2""><br><p align=""center""><a href=""" &
strPageU & """><img src=""" & DivLinePictureFilename & """ align=""bottom""
BORDER = ""0"" alt=""Top Divider""></a></p></td></tr>"
    End If
    Select Case strPageU
        Case "photo.stm"
            Print #FileOutNo, "<form enctype=""multipart/form-data""
action=""../../../phul.asp"" name=""images"" method=""POST"">"
        Case "html.stm"
            Print #FileOutNo, "<form enctype=""multipart/form-data""
action=""../../../HTMup.asp"" name=""pages"" method=""POST"">"
        Case "htmlpage1.stm"
            Print #FileOutNo, "<form enctype=""multipart/form-data""
action=""../../../HTMPageup.asp"" name=""htmlpage1"" method=""POST"">"
        Case "htmlpage2.stm"
            Print #FileOutNo, "<form enctype=""multipart/form-data""
action=""../../../HTMPageup.asp"" name=""htmlpage2"" method=""POST"">"
        Case "htmlpage3.stm"
            Print #FileOutNo, "<form enctype=""multipart/form-data""
action=""../../../HTMPageup.asp"" name=""htmlpage3"" method=""POST"">"
        Case "htmlpage4.stm"
            Print #FileOutNo, "<form enctype=""multipart/form-data""
action=""../../../HTMPageup.asp"" name=""htmlpage4"" method=""POST"">"
        Case "htmlpage5.stm"
            Print #FileOutNo, "<form enctype=""multipart/form-data""
action=""../../../HTMPageup.asp"" name=""htmlpage5"" method=""POST"">"
        Case "htmlpage6.stm"
            Print #FileOutNo, "<form enctype=""multipart/form-data""
action=""../../../HTMPageup.asp"" name=""htmlpage6"" method=""POST"">"
        Case "htmlpage7.stm"
            Print #FileOutNo, "<form enctype=""multipart/form-data""
action=""../../../HTMPageup.asp"" name=""htmlpage7"" method=""POST"">"
        Case "htmlpage8.stm"
            Print #FileOutNo, "<form enctype=""multipart/form-data""
action=""../../../HTMPageup.asp"" name=""htmlpage8"" method=""POST"">"
        Case "htmlpage9.stm"
            Print #FileOutNo, "<form enctype=""multipart/form-data""
action=""../../../HTMPageup.asp"" name=""htmlpage9"" method=""POST"">"
        Case "htmlpage10.stm"
            Print #FileOutNo, "<form enctype=""multipart/form-data""
action=""../../../HTMPageup.asp"" name=""htmlpage10"" method=""POST"">"
        Case "htmlpage11.stm"
            Print #FileOutNo, "<form enctype=""multipart/form-data""
action=""../../../HTMPageup.asp"" name=""htmlpage11"" method=""POST"">"
        Case "htmlpage12.stm"
            Print #FileOutNo, "<form enctype=""multipart/form-data""
action=""../../../HTMPageup.asp"" name=""htmlpage12"" method=""POST"">"
        Case "htmlpage13.stm"
            Print #FileOutNo, "<form enctype=""multipart/form-data""
action=""../../../HTMPageup.asp"" name=""htmlpage13"" method=""POST"">"
        Case "htmlpage14.stm"
            Print #FileOutNo, "<form enctype=""multipart/form-data""
action=""../../../HTMPageup.asp"" name=""htmlpage14"" method=""POST"">"
        Case "htmlpage15.stm"
            Print #FileOutNo, "<form enctype=""multipart/form-data""
action=""../../../HTMPageup.asp"" name=""htmlpage15"" method=""POST"">"
```

-continued

```
        Case Else
            Print #FileOutNo, "<form action=""../../../Update.asp"" method=""POST"">"
    End Select
    Print #FileOutNo, "<input type=""hidden"" name=""HTMLPath"" value=""" &
txtHTMLPath & """>"
    Print #FileOutNo," <input type=""hidden"" name=""LogPath"" value=""" &
Mid(PwdDirPath, Len(strPwdPathPrefix) + 1) & """>"
    Print #FileOutNo, "<input type=""hidden"" name=""Type"" value=""" & strValue &
""">"
    'Print #FileOutNo, "<input type=""hidden"" name=""URL"" value=""" & strURL &
""">"
End Sub
Public Sub CreateUpdateHeaderNavBar(strPageU As String)
    'This routine prints out the top "update" navigation bar
    '(including only user selected pages)
    Dim i As Integer
'Create a table for framing the nav bar
Print #FileOutNo, "<table border=""0"" width=""600"" cellspacing=""0""
cellpadding=""0"">"
    Print #FileOutNo, "<tr><td colspan=""2""><p
align=""center""><strong>Update:  "
    If chkAboutTheTeacher = "Y" And strPageU <> "teacher.stm" Then Print #FileOutNo,
"|<a href=""uteacher.stm"">" & txtAbout & "</a> "
    If chkHomework = "Y" And strPageU <> "homework.stm" Then Print #FileOutNo, "|
<a href=""uhomework.stm"">" & txtHomework & "</a> "
    If chkHomework2 = "Y" And strPageU <> "homework2.stm" Then Print #FileOutNo,
"|<a href=""uhomework2.stm"">" & txtHomework2 & "</a> "
    If chkHomework3 = "Y" And strPageU <> "homework3.stm" Then Print #FileOutNo,
"|<a href=""uhomework3.stm"">" & txtHomework3 & "</a> "
    If chkHomework4 = "Y" And strPageU <> "homework4.stm" Then Print #FileOutNo,
"|<a href=""uhomework4.stm"">" & txtHomework4 & "</a> "
    If chkHomework5 = "Y" And strPageU <> "homework5.stm" Then Print #FileOutNo,
"|<a href=""uhomework5.stm"">" & txtHomework5 & "</a> "
    If chkHomework6 = "Y" And strPageU <> "homework6.stm" Then Print #FileOutNo,
"|<a href=""uhomework6.stm"">" & txtHomework6 & "</a> "
    If chkHomework7 = "Y" And strPageU <> "homework7.stm" Then Print #FileOutNo,
"|<a href=""uhomework7.stm"">" & txtHomework7 & "</a> "
    If chkAnnouncements = "Y" And strPageU <> "announce.stm" Then Print
#FileOutNo, "|<a href=""uannounce.stm"">" & txtAnnouncements & "</a>"
    If chkFAQ = "Y" And strPageU <> "faq.stm" Then Print #FileOutNo, "|<a
href=""ufaq.stm"">" & txtFAQ & "</a> "
    If chkLinks = "Y" And strPageU <> "links.stm" Then Print #FileOutNo, "|<a
href=""ulinks.stm"">" & txtLinks & "</a>"
    For i = 2 To 7
        If chkLinksN(i) = "Y" And strPageU <> "links" & CStr(i) & ".stm" Then Print
#FileOutNo, "|<a href=""ulinks" & CStr(i) & ".stm"">" & txtLinksN(i) & "</a>"
    Next i
    If chkCalendar = "Y" And strPageU <> "calendar.stm" Then Print #FileOutNo, "|<a
href=""ucalendar.stm"">" & txtCalendarN(1) & "</a>"
    For i = 2 To 7
        If chkCalendarN(i) = "Y" And strPageU <> "calandar" & CStr(i) & ".stm" Then
Print #FileOutNo, "|<a href=""ucalendar" & CStr(i) & ".stm"">" & txtCalendarN(i) &
"</a>"
    Next i
    If chkPhoto = "Y" And strPageU <> "photo.stm" Then Print #FileOutNo, "|<a
href=""uphoto.stm"">" & txtPhoto & "</a>"
    For i = 1 To 15
        If chkHTMLPage(i) = "Y" And strPageU <> "htmlpage" & CStr(i) & ".stm" Then
Print #FileOutNo, "|<a href=""uhtmlpage" & CStr(i) & ".stm"">" & txtHTMLPage(i) &
"</a>"
    Next i
    If chkHTML = "Y" And strPageU <> "html.stm" Then Print #FileOutNo, "|<a
href=""uhtml.stm"">" & txtHTML & "</a>"
    Print #FileOutNo, "|<a href=""update.htm"">Other</a>"
    Print #FileOutNo, "|<a href=""" & strRelAddrPre & "Help.htm"">Help</a>
|</strong></td></tr>"
    Print #FileOutNo, "<tr><td colspan=""2""><p
align=""center""><strong>View:  "
    If chkAboutTheTeacher = "Y" Then Print #FileOutNo, "| <a href=""teacher.stm"">" &
txtAbout & "</a>"
    If chkHomework = "Y" Then Print #FileOutNo, "| <a href=""homework.stm"">" &
txtHomework & "</a>"
    If chkHomework2 = "Y" Then Print #FileOutNo, "| <a href=""homework2.stm"">" &
txtHomework2 & "</a>"
    If chkHomework3 = "Y" Then Print #FileOutNo, "| <a href=""homework3.stm"">" &
txtHomework3 & "</a>"
    If chkHomework4 = "Y" Then Print #FileOutNo, "| <a href=""homework4.stm"">" &
txtHomework4 & "</a>"
```

-continued

```
    If chkHomework5 = "Y" Then Print #FileOutNo, "| <a href=""homework5.stm"">" &
txtHomework5 & "</a>"
    If chkHomework6 = "Y" Then Print #FileOutNo, "| <a href=""homework6.stm"">" &
txtHomework6 & "</a>"
    If chkHomework7 = "Y" Then Print #FileOutNo, "| <a href=""homework7.stm"">" &
txtHomework7 & "</a>"
    If chkAnnouncements = "Y" Then Print #FileOutNo, "| <a href=""announce.stm"">" &
txtAnnouncements & "</a>"
    If chkFAQ = "Y" Then Print #FileOutNo, "| <a href=""faq.stm"">" & txtFAQ & "</a>
"
    If chkLinks = "Y" Then Print #FileOutNo, "| <a href=""links.stm"">" & txtLinks &
"</a>"
    For i = 2 To 7
        If chkLinksN(i) = "Y" Then Print #FileOutNo, "| <a href=""links" & CStr(i) &
".stm"">" & txtLinksN(i) & "</a>"
    Next i
    If chkCalendar = "Y" Then Print #FileOutNo, "| <a href=""calendar.stm"">" &
txtCalendarN(1) & "</a>"
    For i = 2 To 7
        If chkCalendarN(i) = "Y" Then Print #FileOutNo, "| <a href=""calendar" & CStr(i)
& ".stm"">" & txtCalendarN(i) & "</a>"
    Next i
    If chkPhoto = "Y" Then Print #FileOutNo, "| <a href=""photo.stm"">" & txtPhoto &
"</a>"
    For i = 1 To 15
        If chkHTMLPage(i) = "Y" Then Print #FileOutNo, "| <a href=""htmlpage" &
CStr(i) & ".stm"">" & txtHTMLPage(i) & "</a>"
    Next i
    If chkPage1 = "Y" And chkHTML = "Y" Then Print #FileOutNo, "| <a
href=""page1.htm"">" & txtPage1 & "</a>"
    If chkPage2 = "Y" And chkHTML = "Y" Then Print #FileOutNo, "| <a
href=""page2.htm"">" & txtPage2 & "</a>"
    If chkPage3 = "Y" And chkHTML = "Y" Then Print #FileOutNo, "| <a
href=""page3.htm"">" & txtPage3 & "</a>"
    Print #FileOutNo, "|</strong></td></tr>"
End Sub
Public Sub CreateUpdateFooter(strType As String)
    'This routine writes out the common footer HTML
    'for all of the "update pages"
    On Error Resume Next
    If strType = "c" Then
        'Print #FileOutNo, "<TABLE WIDTH=""600"" BORDER=""0""
CELLSPACING=""0""
        'Print #FileOutNo, "CELLPADDING=""0"" HEIGHT=""100"">"
        Print #FileOutNo, "<tr><td colspan=""2""><a name=""Months""></a>"
        Print #FileOutNo, "<p align=""center""> "
        Print #FileOutNo, "<p align=""center"" style=""line-height: 100%; word-spacing: 0;
margin-top: 0; margin-bottom: 0""><a href=""../../../calendar/calendarpopup08.htm""
onclick=""NewWindow(this.href,'name','280','280','no');return false;"">August</a>"
        Print #FileOutNo, "| <a href=""../../../calendar/calendarpopup09.htm""
onclick=""NewWindow(this.href,'name','280','280','no');return false;"">September</a> |
<a href=""../../../calendar/calendarpopup10.htm""
onclick=""NewWindow(this.href,'name','280','280','no');return false;"">October</a> |"
        Print #FileOutNo, "<a href=""../../../calendar/calendarpopup11.htm""
onclick=""NewWindow(this.href,'name','280','280','no');return false;"">November</a>"
        Print #FileOutNo, "| <a href=""../../../calendar/calendarpopup12.htm""
onclick=""NewWindow(this.href,'name','280','280','no');return
false;"">December</a></p>"
        Print #FileOutNo, "<p align=""center""style=""line-height: 100%; word-spacing: 0;
margin-top: 0; margin-bottom: 0""><a href=""../../../calendar/calendarpopup01.htm""
onclick=""NewWindow(this.href,'name','280','280','no');return false;"">January</a>"
        Print #FileOutNo, "| <a href=""../../../calendar/calendarpopup02.htm""
onclick=""NewWindow(this.href,'name','280','280','no');return false;"">February</a> | <a
href=""../../../calendar/calendarpopup03.htm""
onclick=""NewWindow(this.href,'name','280','280','no');return false;"">March</a> |"
        Print #FileOutNo, "<a href=""../../../calendar/calendarpopup04.htm""
onclick=""NewWindow(this.href,'name','280','280','no');return false;"">April</a>"
        Print #FileOutNo, "| <a href=""../../../calendar/calendarpopup05.htm""
onclick=""NewWindow(this.href,'name','280','280','no');return false;"">May</a> | <a
href=""../../../calendar/calendarpopup06.htm""
onclick=""NewWindow(this.href,'name','280','280','no');return false;"">June</a> |"
        Print #FileOutNo, "<a href=""../../../calendar/calendarpopup07.htm""
onclick=""NewWindow(this.href,'name','280','280','no');return false;"">July</a></p>"
        Print #FileOutNo, "<p align=""center""style=""line-height: 100%; word-spacing: 0;
margin-top: 0; margin-bottom: 0"">  </td></tr>"
        'Print #FileOutNo, "</table>"
    End If
```

-continued

```
Select Case strGradeLevel
    Case "Elementary"
        Print #FileOutNo, "<tr><td colspan=""2""><br><CENTER><a
href=""../../../ads/" & strType & "etbnr.htm""><IMG SRC=""../../../ads/" & strType &
"etbnr.gif"" BORDER = ""0"" alt=""Ad Link""></a></CENTER></td></tr>"
    Case "Middle"
        Print #FileOutNo, "<tr><td colspan=""2""><br><CENTER><a
href=""../../../ads/" & strType & "mtbnr.htm""><IMG SRC=""../../../ads/" & strType &
"mtbnr.gif"" BORDER = ""0"" alt=""Ad Link""></a></CENTER></td></tr>"
    Case "High School"
        Print #FileOutNo, "<tr><td colspan=""2""><br><CENTER><a
href=""../../../ads/" & strType & "htbnr.htm""><IMG SRC=""../../../ads/" & strType &
"htbnr.gif"" BORDER = ""0"" alt=""Ad Link""></a></CENTER></td></tr>"
    Case "College"
        Print #FileOutNo, "<tr><td colspan=""2""><br><CENTER><a
href=""../../../ads/" & strType & "ctbnr.htm""><IMG SRC=""../../../ads/" & strType &
"ctbnr.gif"" BORDER = ""0"" alt=""Ad Link""></a></CENTER></td></tr>"
    Case Else
        Print #FileOutNo, "<tr><td colspan=""2""><br><CENTER><a
href=""../../../ads/" & strType & "etbnr.htm""><IMG SRC=""../../../ads/" & strType &
"etbnr.gif"" BORDER = ""0"" alt=""Ad Link""></a></CENTER></td></tr>"
    End Select
    Print #FileOutNo, "</table>"
    Print #FileOutNo, "</form>"
    Select Case strType
        Case "h", "a", "t", "l", "f"
            Print #FileOutNo, "<h5>© 2000–2001 TeacherWeb.Com</h5>"
        Case Else
            Print #FileOutNo, "<h5>© 2001 TeacherWeb.Com</h5>"
    End Select
    Print #FileOutNo, "</body>"
    Print #FileOutNo, "</html>"
End Sub
```

The code to update the text content of the Homework Type page is shown below. The referenced subroutines are not shown as they are used for cosmetic editing only. Here the same code is used to prepare the (simple) include file used by both the Homework and Update Homework pages whereas for other page types two very different, separate sections of code are used to create two separate (and complex) include files for the view and for the update pages.

```
Private Sub HUpdate( )
'This routine updates the include file for the Homework
'page AND the Update Homework page.
'It creates the include file based on the user's input as
'entered on the Update Homework page.
    Dim FileOutNo As Long
    Dim strComments As String
    Dim i As Integer
    On Error Resume Next
'Get the user edited text
    strComments = RTrim$(m_Request.Form("Comments"))
'Edit input
    i = InStr(1, strComnments, "<")
    If i > 0 Then
        blnGreaterThanSignWarning = True
    End If
    AddInNewLineChars strComments
    StripOutExtraChars strComments
    CheckForBadWeb strComments
'Open the Homework include page
    FileOutNo = FreeFile
    Open m_Request.Form("HTMLPath") &
    "Homework.inc" For Output As
    FileOutNo
'Update it
    Print #FileOutNo, strComments
'Write it out and close it
    Close FileOutNo
End Sub
```

I claim:

1. A system for a host to provide a tool for creating, instantiating, maintaining, and accessing user updateable Web sites of user updateable Web pages, said system comprising:

a host system;

at least one remote communications facility;

data storage means within said host system containing:
  a set of user updateable Web page types corresponding to a plurality of features available in a user updateable Web site, and
  at least one user updateable Web site type having a Home Web page linked to at least one instance of one of said user updateable Web page types;

computer processing means within said host for:
  creation and maintenance at said host and storage of said at least one user updateable Web site type in said data storage, and
  creation, selection and maintenance of an instance of said at least one user updateable Web site type and transmission of said user updateable Web pages of said selected instance to said at least one remote communications facility in accordance with criteria provided by said at least one remote communications facility;

a communications network associated with said host system, said communications network being controlled by said computer processing means to exchange data between said host computer system and said at least one remote communications facility; and input-output means at said at least one remote communications facility for enabling at least one of:
  (i) for a user to specify selection criteria for said at least one user updateable Web site type and display of at least one user updateable Web page of said selected user updateable Web site type that meet said selection criteria, (ii) for an authorized user to define an instance of said at least one user updateable Web site type for inclusion in said data storage, (iii) for an authorized user to specify criteria for viewing, selection, and display of an instance that meets said selection criteria, (iv) for an authorized user to maintain an instance and store said maintained instance in said data storage, and (v) for authorized users to delete an instance from said data storage; wherein said computer processing means creates and maintains said instances without requiring the user to have any technical knowledge of Web site implementation; and wherein each respective updateable Web page in the system has an associated companion page comprising a copy of variable data from the respective Web page, the updateable Web page being updated by a user with authorization by directly typing text and/or by adding/removing graphics to the associated companion page without typing on a template and/or using website markup language.

2. The system according to claim 1, wherein: said host system and said at least one remote communications facility exchange data through the Internet; and said computer input-output means is a Web appliance that employs a Web browser.

3. The system according to claim 1, wherein said computer processing means further provide tailored functionality for at least one type of user updateable Web page.

4. The system according to claim 1, wherein the set of user updateable Web page types comprises a predefined set of user updateable Web page types that are defined in parameterized software.

5. The system according to claim 1, further comprising a subscriber list of users are associated with a specific user updateable Web Page, said users being notified electronically when a content of the user updateable Web Page has been modified.

6. The system according to claim 2, wherein: said data storage further comprise parameters stored in a parameter file defining each said user updateable Web site type, said parameters being provided by a user community; and said user updateable Web pages types of each said user updateable Web site type comprise at least one user updateable Web page of a single type or a composite of types selected from the group consisting of:
single updateable text block page,
multiple updateable text blocks page,
links page,
index list and entries page,
uploaded word processing file in free form,
table page, uploaded file page,
uploaded web page, integrated uploaded Web page, and Web quest page;
such that said selection of user updateable Web page types is made in accordance with said parameters.

7. The system according to claim 2, wherein: each said user updateable Web page of each instance further comprises a view Web page having both a fixed part and a variable part; and said computer input-output means at said at least one remote communications facility further enable at least one of:
for an authorized user to update said variable part of at least one view Web page of an instance, and
for an authorized user to customize said fixed part of at least one update Web pages of an instance;
such that the updates redefine said instance stored in said data storage.

8. The system according to claim 2, further comprising customization means to enable an authorized user to perform at least one customization with respect to an instance, said customization selected from the group consisting of:
add Web page;
delete Web page;
rename Web page;
change background of all Web pages;
change divider lines of all Web pages;
change graphic icons associated with Web pages;
change fixed text of Web pages;
customize Home Web page;
change web page title in all Web pages;
change e-mail name in all view Web pages and Home Web page; and
delete e-mail facility in all view Web pages and Home Web page.

9. The system according to claim 3, wherein said tailored functionality is a multi-level index to the user updateable Web pages of all instances of a user updateable Web site type.

10. The system according to claim 7, wherein the associated companion page of each said view Web page comprises a tailor made companion update Web page having input areas into which an authorized user updates said variable part of said view Web page by updating said tailor made companion update Web page.

11. The system according to claim 8, wherein said customization means comprise at least one customization Web page for each said customization type.

12. The system according to claim 8, wherein password protected access to all instances of at least one user updateable Web site type is provided for: each said instance; each view page of each said instance; each update page of each said instance; said customization means.

13. The system according to claim 10, wherein each of said updates is selected from the group of consisting of:
text,
file name, and
URL;
wherein said selection is made in accordance with said user updateable Web page type of the view page being updated.

14. The system according to claim 13, wherein said file name identifies a file type selected from the group consisting of:
image,
word processor,
spreadsheet,
presentation,
audio,
animation, and
video.

15. The system according to claim 14, wherein the Web page identified by said URL includes zero or more embedded user HTML markers such that a user is able to update text at the zero or more locations of said HTML marker in said Web page when it is displayed by said Web browser.

16. A method of automatically creating, instantiating, maintaining, and accessing over a communications network, user updateable Web sites of user updateable Web pages, comprising the steps of:

gathering user requirements for a plurality of features in a Web site;

defining by a host system user updateable Web sites each having user updateable Web pages that correspond to gathered user requirements;

maintaining data storage at the host which contain (i) a set of user updateable Web page types corresponding to the plurality of features required in a user updateable Web site, (ii) at least one user updateable Web site type having a Home Web page linked to at least one instance of one of the user updateable Web page types, (iii) at least one instance of a user updateable Web site type;

the host system allowing access via the communications network to remotely accessing users to specify user selection criteria;

the host system searching the maintained data storage based on specified selection criteria of remotely accessing users who have been allowed access via the communications network; and downloading via the communications network the results of the searching step to the remotely accessing user;

providing by the host system the ability for the remotely accessing user to select a view, update or customize action from the downloaded results, the remotely accessing user selecting an action;

performing the selected action;

wherein if the action performed by the user was to update or customize then, providing by the host system to an authorized remotely accessing user an associated companion page of an updateable user Web page type, said associated companion page comprising a copy of the variable data in the updateable user Web page type, and enabling a user to edit content of the updateable user Web page type by directly adding/deleting content of the associated companion page without using Web site markup language commands and/or a template, and said host, in response to receiving an updated companion page from the authorized remotely accessing user, regenerating an instance of a Web page type, the host system storing the regenerated Web in the data storage and the host system downloading via the communications network the instance of the regenerated Web page type to the remotely accessing user.

17. The method according to claim 16, wherein the communications network is the Internet and the remotely accessing users employ a Web browser.

18. The method according to claim 16, wherein a subscriber list of users are associated with a specific user updateable Web Page, said users being notified electronically when a content of the user updateable Web Page has been modified.

19. The method according to claim 17, wherein: the allowing step further comprises the step of enforcing password protection for access; and the performing step further comprises the step of enforcing password protection for each action.

20. The method according to claim 17, wherein: the maintaining step further comprises the step of representing each user updateable Web page as a view Web page having a fixed part and a variable part and a companion update Web page for updating the variable part of each view Web page; and the performing step further comprises the steps of downloading a view, update, or customize page to correspond to the action selected, and uploading user input from an update or customize page.

21. A computer system comprising data storage and a tool for creating a user updateable Web site, said tool comprising:

a set of at least one stored user updateable Web page type, and at least one stored user updateable Web site type having user customization Web pages and user updateable Web pages each represented by a view Web page and a companion update Web page that correspond to a plurality of user required features in a Web site; and wherein each respective updateable Web page has an associated companion page comprising a copy of the variable data in the respective Web page, the updateable Web page being updated by an authorized user by directly typing text and/or adding/removing graphics to the companion page without using Web site markup language and/or a template, an input-output means for enabling at least one of:

for users to create an instance of said at least one user updateable Web site and store said instance in said data storage, for users to retrieve and display said view Web pages of an instance of said instance, for users to retrieve and display view Web pages, enter Web page updates to said view Web pages into said companion update Web pages, regenerate and store said instance in said data storage, and for users to retrieve and display said customization pages, enter Web site customizations, regenerate and store said instance in said data storage; and a parameterized software program which generates said instance of a user updateable Web site type to correspond to said user required features and regenerates said instance to reflect said user Web page updates and Web site customizations; wherein said parameterized software generates and regenerates said Web site without requiring the user to have any technical knowledge of how to implement a Web site and Web pages.

22. The system of claim 21, wherein said input-output means is a Web appliance.

23. The system according to claim 21, wherein: said computer system and said input-output means exchange data through the Internet; and said input-output means employs a Web browser.

24. The computer system according to claim 21, wherein a subscriber list of users are associated with a specific View page, said users being notified electronically when a content of the View page has been modified.

25. A method of automatically creating, instantiating, maintaining, and viewing user updateable Web sites of user updateable Web pages, comprising: providing data storage and a tool for creating, instantiating, maintaining, and viewing a user updateable Web site, said tool comprising:

a set of at least one stored user updateable Web page types, each respective updateable Web page type has an associated companion page comprising a copy of data on the respective Web page, the updateable Web page type permitting an authorized user to update by directly typing text and/or adding/removing graphics to the companion page without using a template and/or a Web site markup language, and at least one stored user updateable Web site type having user customization Web pages and user updateable Web pages each represented by a view Web page and a companion update Web page that correspond to a plurality of user required features in a Web site;

an input-output device for enabling at least one of:

for users to create an instance of said at least one user updateable Web site and store said instance in said data storage, for users to retrieve and display said view Web pages of an instance, for users to retrieve and display view Web pages, enter Web page updates to said view Web pages into said companion update Web pages, regenerate and store said instance in said data storage, and for users to retrieve and display said customization pages, enter Web site customizations, regenerate and store said instance in said data storage; and a parameterized software program which generates said instance of a user updateable Web site type to correspond to said user required features and regenerates said instance to reflect said user Web page updates and Web site customizations;

gathering user requirements for a plurality of features in a Web site;

allowing access for users to specify user selection criteria;

searching by the tool of the maintained data storage based on specified selection criteria; and displaying the results of the searching step to the user;

the user selecting a view, update, or customize action from the displayed results;

performing the selected action by the tool;

wherein when the action performed was update or customize, the tool provides to an authorized remotely accessing user an associated companion page of an updateable user Web page, said associated companion page comprising a copy of the variable data in the updateable user Web page, and editing of content of the updateable user Web page is performed by directly adding/deleting content and/or adding/removing graphics of the associated companion page without using a Web site markup language and/or a template, and said tool, in response to receiving an updated companion page from the authorized remotely accessing user, regenerating a Web page;

the tool storing the regenerated Web page in the data storage; and redisplaying the regenerated Web page to the user.

26. The method according to claim 25, wherein a subscriber list of users are electronically notified when a content of the View page has been modified.

* * * * *